United States Patent [19]
Bulgrin

[11] Patent Number: 5,997,778
[45] Date of Patent: Dec. 7, 1999

[54] AUTO-TUNED, ADAPTIVE PROCESS CONTROLLED, INJECTION MOLDING MACHINE

[75] Inventor: Thomas C. Bulgrin, Columbia Station, Ohio

[73] Assignee: Van Dorn Demag Corporation, Strongsville, Ohio

[21] Appl. No.: 09/065,399

[22] Filed: Apr. 23, 1998

[51] Int. Cl.[6] .................................................. B29C 45/77
[52] U.S. Cl. ................... 264/40.1; 264/40.7; 264/328.1; 364/475.05; 425/145
[58] Field of Search ................................. 264/40.1, 40.5, 264/40.7, 328.1; 425/145, 149; 364/475.05, 475.09

[56] References Cited

U.S. PATENT DOCUMENTS

| | | |
|---|---|---|
| 4,753,588 | 6/1988 | Kiya . |
| 5,062,785 | 11/1991 | Stroud, III et al. . |
| 5,182,716 | 1/1993 | Stroud, III et al. . |
| 5,258,918 | 11/1993 | Giancola . |
| 5,362,222 | 11/1994 | Faig et al. . |
| 5,456,870 | 10/1995 | Bulgrin . |
| 5,482,662 | 1/1996 | Nakamura et al. . |
| 5,493,503 | 2/1996 | Richards et al. . |
| 5,518,671 | 5/1996 | Takizawa et al. ..................... 264/40.1 |
| 5,552,690 | 9/1996 | Hiraoka . |
| 5,578,256 | 11/1996 | Austin . |
| 5,645,775 | 7/1997 | Spahr et al. . |
| 5,786,999 | 7/1998 | Spahr et al. ........................ 364/475.05 |
| 5,870,305 | 2/1999 | Yokoyama ........................... 364/475.5 |
| 5,885,624 | 3/1999 | Katsuta et al. ........................... 425/149 |
| 5,914,077 | 6/1999 | Fujita ..................................... 264/40.1 |
| 5,916,501 | 6/1999 | Hehl ..................................... 264/40.1 |

*Primary Examiner*—Jill L. Heitbrink
*Attorney, Agent, or Firm*—Frank J. Nawalanic

[57] ABSTRACT

An injection molding machine uses a summed, multi-term control law to control ram velocity during the injection stroke of a molding cycle to emulate a user set velocity profile. An automatic calibration method sets no load ram speeds to duplicate user set ram speeds. Finite impulse response filters produce open loop, no load control signals at advanced positions on the velocity profile to account for lag in system response. An adaptive, error term indicative of load disturbance, observed from a preceding cycle is added at the advanced travel position predicted by the finite impulse response filter to produce a predictive open loop, load compensated control signal. Finally, an auto tuned PID controller develops a real time, feedback load disturbance signal summed with the open loop control signal to produce a drive signal for the machine's proportioning valve.

35 Claims, 10 Drawing Sheets

AUTO-TUNED, ADAPTIVE PROCESS CONTROLLED, INJECTION MOLDING MACHINE

This invention relates to injection molding machines and more particularly to the molding machine's control system.

The invention is particularly applicable to and will be described with specific reference to a system for controlling the ram speed of a hydraulically powered injection molding machine during the injection stroke. However, those skilled in the art will recognize that the invention has broader application and can be applied to all electric injection molding machines, blow molding machines and other devices in which the translational speed of a reciprocating prime mover must be precisely controlled.

INCORPORATION BY REFERENCE

My prior U.S. Pat. No. 5,456,870 dated Oct. 10, 1995 entitled "Barrel Temperature State Controller for Injection Molding Machine", and U.S. Pat. No. 5,493,503 dated Feb. 20, 1996 entitled "Clamp Control for Injection Molding Machine" are incorporated by reference herein. My prior patents do not form part of the present invention but explain details of the controls of injection molding machines which are useful in understanding the present invention so that such details need not necessarily be described in detail herein.

BACKGROUND

The molding cycle performed by an injection molding machine typically comprises the phases of clamp, inject, pack, recover and eject. This invention is principally concerned with the inject phase or injection stroke of the molding cycle.

The study of how plastic flows through the mold is called mold flow analysis. The flow of plastic is critical to a number of factors in the final part including surface flaws and structural integrity. Mold flow analysis predicts the shape of the part at all times as its is being formed and can predict areas of the part where a minimum injection speed is required to fill the part before the gates freeze or perhaps a maximum injection speed above which splaying may cause surface flaws. Experience gained from the use of any particular mold will show where certain speeds are required in mold filling to produce acceptable molded parts. On a production basis, typical practice is to minimize the injection time to achieve maximum machine throughput. All of this is achieved by controlling the injection speed of the ram during mold filling and to, a lesser extent, by the packing phase of the cycle which assures that the mold remains filled with molding material under a desired pressure until the molding material solidifies.

Very early molding machines were operated manually. To inject plastic into the mold, a crank wheel was turned. The faster the wheel was turned, the faster the injection speed. To increase pressure, the crank was turned harder. When crank wheels were replaced with hydraulic systems, the injection was controlled by the flow of oil into the injection cylinder. Various techniques have evolved over the years to control the flow and pressure of the oil. As noted above, controlling the oil flow controls the ram speed and controlling the ram speed controls how the molding material fills the mold. As mold flow analysis matured into a science, the art of injection molding became replaced with decisions dictated by mold flow analysis which required that controls be added to the hydraulic system to control the flow and pressure of the oil. This invention is directed to such a system (although the invention is also applicable to controlling the speed and torque of motors used in "all electric" molding machines).

Initially control systems were simply timers which caused various valve openings at set times during the injection stroke. The timers gave way to micro switches which were tripped by ram movement to cause various valve settings. The micro switches were replaced by feedback position sensors in use today developing signals used by programmable controllers to control ram speed.

The typical injection molding machine most likely observed today has an operator station with a screen display and keyboard which sends signals to a programmable logic controller (PLC). The operator station typically includes a screen whereat the operator can set desired ram velocities at fixed ram travel increments. Typically the ram travel of the machine is divided into ten equal lengths or zones. The operator sets the speed at each zone so that a series of bar graphs are assembled. The ram follows the bar graphs. Recent control improvements have replaced the bar graphs with points at each zone boundary so that the ram is not programmed to travel at constant speed within each zone but at a speed which constantly varies from one set point at one zone boundary to another set point at an adjacent zone boundary. When the operator makes a number of desired velocity settings at set ram travel positions which the ram is to follow, he establishes a "velocity profile". The object of the control system is to actually cause the ram to travel at the user set speeds at the user set positions i.e., to emulate the velocity profile. As will be explained in the Detailed Description of the Invention below, this invention causes better control of the ram speed than what heretofore has been possible.

The control within the PLC which causes the ram to follow the velocity profile is typically a PID controller (proportional/integration/derivative controller). A PID controller receives a velocity feedback signal from a sensor on the machine and compares it with the user set velocity control signal to generate an error compensated control signal by which the machine's speed is controlled. The control signal is then converted to an analog driving signal controlling a solenoid valve regulating a hydraulic proportioning valve in turn controlling flow from a pump to a prime mover causing ram movement. The PID controller is the typical mechanism for achieving closed loop control. It is generally used because the machine's control modules are typically purchased by injection molding machine manufacturers from control suppliers who assemble control systems for special applications, such as injection molding machines, from any number of common control modules having desired response times, sensitivities, robustness, etc. The systems use a common control, such as the PID controller.

The set points entered by the operator are turned into velocity control signals after the machine has been set up and calibrated. Functionally, the user entered set points at the machine console are converted into set point velocity signals by the PLC and outputted at ram travel positions as analog drive signals. The PLC uses the PID controller to provide closed loop control (vis-a-vis ram position sensor signals) to assure that the proper set point velocity signal, corrected for error, is outputted as the drive signal. To prevent the PID controller from having to generate large error corrections, normal practice is to manually calibrate the proportioning valve for set point velocity signals. The solenoid voltage is manually adjusted until movement of the ram is visually detected and the analog signal causing this initial movement is saved in digital form as the valve offset. The solenoid voltage is then manually adjusted to a value whereat maximum rated speed of the ram is observed to occur. For example, if maximum ram speed for the machine is one inch per second and rise travel was five inches, a technician, using his watch, would manually adjust solenoid voltage until he was able to cause the ram to travel five inches in about five seconds. At that point, the span voltage in digitized form would be entered. By assuming a straight line relationship between offset and span a digital signal corresponding to a user set velocity anywhere between zero and one inch per second is calculated by the machine's control. If the machine has an energy savings mode, a second calibration must be done. This technique is not precise. However, conventional thinking is that whatever errors are produced, they can be addressed in the PID control and calibration can only be done without load. Thus, the settings are made to simply assure capacity of the machine.

The PID control, however, has to be tuned. While factory default settings are, of course, provided, the tuning is done through a trial and error procedure by the molding machine manufacturer's technician during machine set up. Basically, the procedure followed after setting span and effect is to boost the ram during the injection stroke and observe the speed response. Various "art form=" techniques are used to adjust the factory settings if the response is deemed sluggish.

Many current machines allow the operator to select open loop or closed loop control to achieve velocity profiling. The open loop mode is achieved by simply using the manually calibrated valve settings set during machine set-up as described. Closed loop is achieved through the tuned PID controller as described or by using the default factory settings for the PID controller. In practice, it often occurs that the PID loop is out of tune with wear and age or if the molder simply changes the molded part. The machine user does not have the sophistication to re-tune the PID loops and closed loop control does not follow the velocity profile. In fact, in many cases the machine with the control in open loop will more closely follow the velocity profile even though, assuming perfect calibration of the proportioning valve, the open loop control cannot account for the load and specifically the disturbances or resistances imposed by the melt on the ram during the injection stroke.

The above summarizes, to a good part, what the assignee of this invention has observed in the marketplace with respect to current control systems (apart from assignee's control system which is the subject of this invention). The literature has disclosed, however, a number of control techniques applied to injection molding control systems.

U.S. Pat. No. 5,645,775 to Spahr et al.; U.S. Pat. No. 5,258,918 to Giancola; U.S. Pat. No. 5,182,716 to Stroud, III et al. and U.S. Pat. No. 5,062,785 to Stroud, III et al. disclose control systems which have specific features for controlling the ram velocity. In these systems, the velocity profile is broken down into zones as discussed above. In order to transition smoothly from one zone to the next zone, the controls transition from open loop to closed loop within a zone. Additionally, there is discussed feed forward but in the sense of feeding a present signal ahead in time and not a predictive signal. Additionally there is disclosed adaptive learning concepts. The latter techniques are well known in control theory and the references simply show that they have been applied to control systems for injection molding machines.

U.S. Pat. No. 5,482,662 to Nakamura et al. discloses a somewhat more sophisticated approach to feed forward control for ram velocity in that pressure sensed by the valve is used to develop a feed forward signal to account for latency response of the valve and another control term is added in when the ram position feedback signal reaches a set differential ratio to the set velocity term. The valve control is said to eliminate overshoot tendencies of the valve resulting from changing signals and the velocity feedback contributes to accuracy during steady state. The Nakamura system appears to be more advanced than the concepts earlier discussed but still uses an additional term switched in or out of the control during injection depending on feedback of a current event.

U.S. Pat. No. 5,578,256 to Austin utilizes the relationship between ram velocity and mold flow to develop a plastic flow characteristic, i.e., pressure, sensed in the mold during a run which is then inputted into the control as an adaptive error term in the next succeeding cycle.

U.S. Pat. No. 4,753,588 to Kiya and U.S. Pat. No. 5,552,690 to Hiraoka relate to electric drive injection molding machines controlling ram speed. Kiya discloses using a feed override look up table to modify the set speeds. Hiraoka uses separate control terms to control motor torque and motor speed. Feedback control at the zone boundaries is used to adjust the torque and velocity settings.

None of the systems discussed appear to utilize feed forward concepts in the predictive sense as disclosed in my U.S. Pat. No. 5,493,503 and this invention may be viewed as an extension of and an improvement to that patent. Further the systems are generally geared to sensing events at zones and making changes during zone progressions by switching control modes or simply by adding adaptive, learned error signals. None of the systems cited discuss the set point signals. They simply generate the set point signals corresponding to the user set points and then utilize feedback techniques to produce the desired ram control.

SUMMARY OF THE INVENTION

Accordingly, it is a principle object of the present invention to provide a control system for an injection molding machine in which the speed of the ram seamlessly follows without lag the set velocity profile in a learned manner.

This feature along with other features of the present invention is achieved in a system (method and apparatus) for variably controlling the speed of the ram of an injection molding machine during the injection stroke of a molding cycle and wherein, at the operating station, a plurality of user set points specifying set ram velocities at set ram travel positions are entered by the machine operator. A mechanism within the machine control automatically establishes from the user set points a second larger plurality of machine set point signals with each set point signal indicative of set ram velocities at set ram travel positions and cumulatively defining a locus of travel and velocity points that include the operator set points and which, in turn, defines a velocity profile that the ram emulates during the injection stroke. A control arrangement is provided for determining a load compensated velocity control signal for each machine set point signal during the injection stroke. The control arrangement which establishes the control signal includes a mechanism for sensing the real time position of the ram during the injection stroke and a mechanism for applying an automatically established, calibrated factor to each machine set point signal which causes the ram to move at approximately the speed of a set point signal when the machine is not under load. The calibrated factor, by assuring repeatable duplication of the velocity profile with the machine not under load, provides a basis or a foundation upon which any control law can be built to account for load disturbances when the machine fills the mold with a shot of molding material.

In accordance with an important feature of the invention, the arrangement for determining the load compensated velocity control signal includes a predictive mechanism for selecting set point signals at advanced ram travel positions which have not been traversed at the time the set point signal is selected for processing as a velocity control signal so that the velocity control signal accounts for the response latency of the machine. Significantly, the set point signal occurring in the future when selected for processing is a predictive set point signal and not a common feed forward signal because it is that velocity signal occurring in future time at a specific ram travel distance on the velocity profile and not a present signal fed forward in time for processing.

In accordance with another important feature of the invention, the arrangement for determining the velocity control signals (which in turn are transformed into a continuous, analog drive signal) further includes a disturbance mechanism to modify each predictive control signal by an error signal. The disturbance mechanism includes a feedback arrangement to compare a real time ram velocity signal with a real time set point signal in the velocity profile at the real time ram travel position to produce a difference signal corresponding to the error signal. A disturbance storage mechanism stores each error signal produced at set ram travel positions during any given injection stroke. The disturbance mechanism selects an error signal stored at the advanced ram travel position corresponding to the advanced travel position of any given predicted control signal. The predictive control signal is then summed with the advanced disturbance error signal. The stored error signals are overwritten by error signals (preferably a percentage thereof) generated during a current molding cycle which are then used in the next successive molding cycle to provide a predictive, load disturbance compensated open loop control of the ram speed during the injection stroke of the molding cycle.

In accordance with another important feature of the invention, the arrangement for determining the velocity control signals includes the mechanism for developing real time ram velocity signals from the real time ram position signals detected on the machine and a controller for developing error signals modifying the real time set point signals processed as velocity control signals. The controller mechanism (which in the preferred embodiment is a PID controller) includes a feedback arrangement for comparing real time ram velocity signals with specific set point signals in the velocity profile at the real time ram travel positions to produce a difference signal corresponding to an error signal whereby any set point signal selected for processing as a velocity control signal is modified by the error signal, in a closed loop arrangement, to account for differences between a real time specified ram speed and a real time detected ram speed resulting from load disturbances detected in the current injection stroke.

In accordance with yet another important feature of the invention, the arrangement for determining the load compensated velocity control signal selectively sums the various velocity control signals defined above to produce the driving signal at the option of the operator. Thus, the operator has the option of i) running the machine solely in a closed loop mode so that only velocity control signals produced by an error signal comparing real time velocity profile speeds with real time ram speeds are used in the aforesaid manner to control the velocity of the ram by sensing real time load disturbances or ii) only an open loop, predictive velocity control signal is used to control the velocity of the ram or iii) only, an open loop predictive ram velocity signal, as defined above, modified by the learned load disturbance error signals, or, iv) an open loop, predictive velocity control signal, with or without adaptive control, is summed with the closed loop real time velocity control signal. In all instances the resulting control signals produce the drive signal controlling ram velocity.

In accordance with a specific, important feature of the invention, the machine is hydraulically driven and the method by which the calibrated factor for modifying the set point signals is machine set and determined by performing the following steps: i) initializing the machine whereat the ram's translational axis is set and the machine's ram position sensors are set to record ram speed and voltage signals inputted to the hydraulic proportioning controlling ram speed as digitized signals; ii) increasing voltage output to the valve until ram movement sensed by the machine occurs and machine recording the output signal as a valve offset signal; iii) incrementally increasing voltage output beyond offset and recording ram speed detected for each incremental increase; and iv) thereafter, machine recording the voltage output level whereat maximum ram rated speed is detected as a valve span signal. By providing a program for machine calibration at the proportioning valve, a precise, no-load correlation between set points and no load ram speed is obtained for each specific notwithstanding the variations in values, etc. between identical model machines. Additionally, an automated calibration procedure permits non-skilled operators to easily recalibrate the machine as it ages, or to provide multiple calibration settings if the machine is equipped with an energy savings feature.

In accordance with another specific feature of the invention, the calibrating method further includes the additional steps of recording the time it takes for the ram to reach at least one set percentage of the maximum ram speed and using that time to automatically machine tune the PID controller.

It is an object of the present invention to provide an injection molding machine with improved velocity profiling characteristics by utilizing an automatic valve calibration process which establishes valve settings including span and offset so that the ram will consistently travel at speeds equal to user set velocity points with the machine not under load and thus afford a basis for developing a control law for modeling machine speed under load.

It is a more specific object of the invention, in conjunction with the immediately preceding object, to also provide in the valve calibration process, an automatic turning of a PID controller incorporated in the machine control system.

Yet another object of the invention is to provide an injection molding machine with improved velocity profiling characteristics which is capable of performing the entire injection stroke under closed loop control or under open loop control or under combined closed loop and open loop control.

An important object of the invention is to provide an injection molding machine which performs velocity profiling by any one or more or any combination of the following features:
  a) closed loop control by means of real time feedback control through use of a PID controller or otherwise;
  b) open loop predictive position based velocity control through FIR filters or otherwise;
  c) open loop predictive position based velocity control adjusted by learned disturbance responses; and d) calibrated adjustment for velocity set points to produce known responses at no load conditions.

Yet another important object of the invention is to provide an improved injection molding control for velocity profiling which is self-learning and adapts over several cycles to consistently reproduce any obtainable velocity profile set by the operator.

An important object of the invention is to provide a velocity profiling system for an injection molding machine which is able to better emulate user set ram velocity position signals than other systems and/or which can process a wider range of profiles than other systems.

An important object of the invention is a velocity profiling system for an injection molding machine which generates a large number of signals at discrete, almost infinitesimally spaced, travel distances to accurately model a desired velocity profile.

Yet another important object of the invention, in combination with the immediately preceding object, is the utilization of finite impulse response filters which are used to generate predictive signals based on variable velocity user set points and automatically detected real time information from machine performed calculations thus enhancing the ability of the system to process a wide range of user set velocity profiles.

Still another object of the invention is the provision of a method for automatically tuning the PID controller used in conventional injection molding machines thereby avoiding trial and error approaches conventionally used and providing for a more responsive control, no matter what control law is actually used by the machine to control velocity profiling.

Another important object of the invention is to provide an improved system for achieving velocity profiling in an injection molding machine by means of a control law which sums control signals specifically developed to address different factors affecting the ram speed of the machine thereby avoiding inconsistent results produced by other systems using either complicated methods or modeling techniques which could easily go awry in practice for any number of reasons.

Yet another object of the invention is to provide an improved system for achieving velocity profiling in an injection molding machine which uses existing machine hardware and existing control hardware so that an injection molding machine having improved capabilities can be offered without price increases normally associated with such improvements.

Another important object of the invention is to provide a velocity profiling control law for an injection molding machine which is superior to that used in other conventional systems.

Still another object of the invention is to provide in a hydraulic driven injection molding machine, a method for automatically calibrating the offset and span settings of the proportional valve to provide improved velocity profiling characteristics of the machine no matter what control techniques are actually used to cause velocity profiling.

These and other objects, features and advantages of the present invention will become apparent to those skilled in the art upon reading and understanding the detailed description of the invention set forth below taken in conjunction with the drawings.

BRIEF DESCRIPTION OF THE DRAWINGS

The invention may take form in certain parts and in an arrangement of certain parts taken together and in conjunction with the drawings which form a part hereof and wherein.

DETAILED DESCRIPTION OF THE INVENTION

Figure 1:
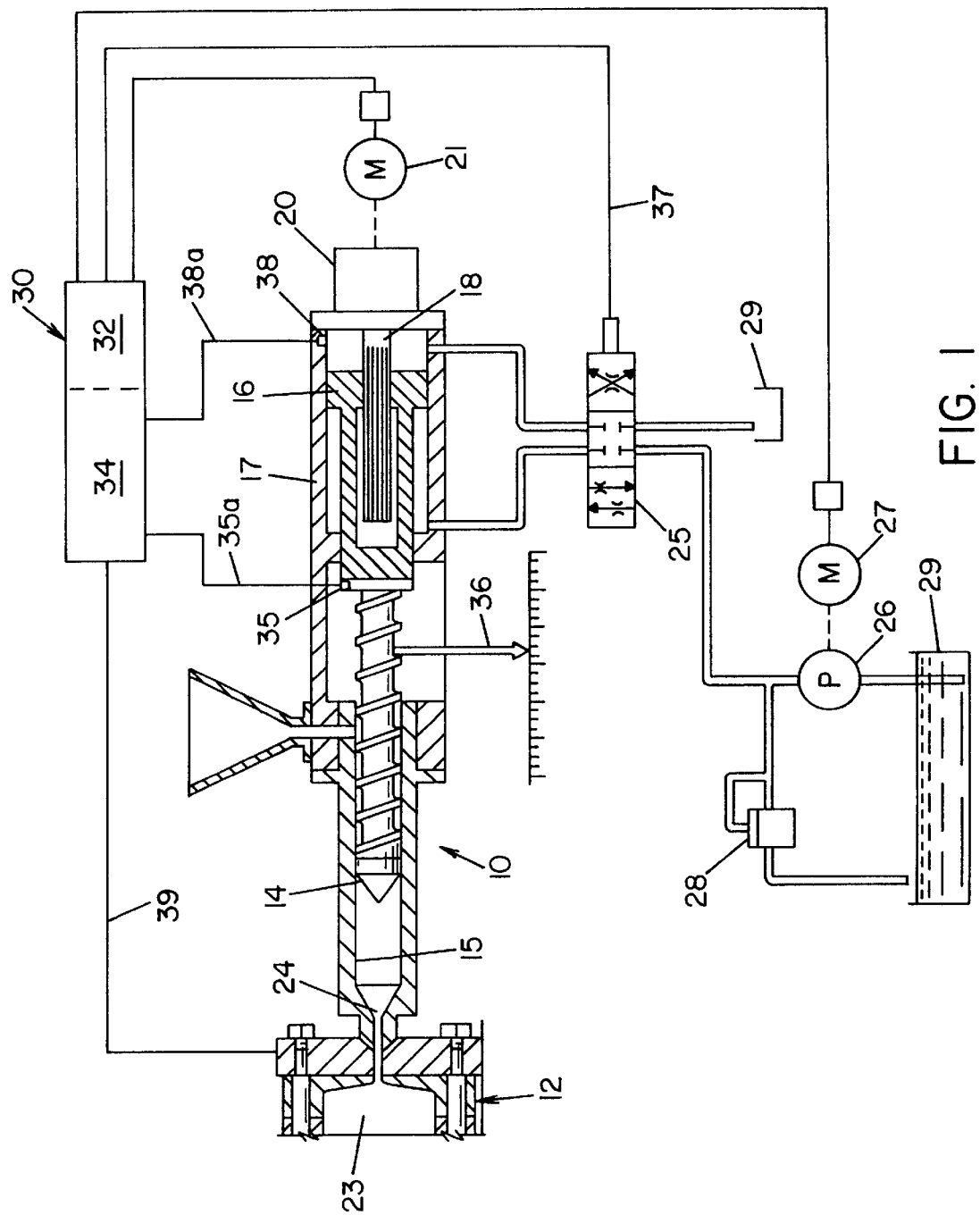
FIG. 1 is a partial schematic view of the ram of an injection molding machine.

Referring now to the drawings wherein the showings are for the purpose of illustrating preferred embodiment of the invention only and not for the purpose of limiting the same, there is shown in FIG. 1 a schematic, pictorial representation of an injection mechanism 10 used in an injection molding machine. A fragmentary portion of the machine's clamp mechanism indicated by reference numeral 12 is also shown.

Injection mechanism 10 includes a screw 14 translatably and rotably disposed within a tubular barrel 15. In the preferred embodiment translation of screw 14 within barrel 15 is achieved by a hydraulic actuator or hydraulic coupling shown to include a sealed piston 16 movable within a cylinder 17. Screw rotation occurs by rotation of a drive shaft 18 secured to a mechanical coupling 20 which, in the schematic diagram illustrated, is a gear box 20. In the arrangement illustrated in FIG. 1, gear box 20 is connected to and driven by an electric motor 21. Alternatively, rotation of screw 14 can occur by a conventional hydraulic piston motor. For schematic illustration purposes, drive shaft 18 is shown splined to piston 16 so that piston 16 can slide within cylinder 17 to cause translation of screw 14 while the rotation of drive shaft 18 causes piston 16 to rotate screw 14 for screw recovery purposes, etc.

When screw 14 moves by translation towards mold mechanism 12 to inject molding material into a mold cavity 23 it is commonly referred to as a ram. Because the present invention is concerned with controlling the translation motion of screw 14 during the injection stroke or injection phase of the molding cycle, screw 14 will henceforth be referred to as ram 14. Although other terminology such as "plunger" may be used to describe screw 14 during injection, as used herein, "ram" means screw 14 and covers the screw motion, whether rotating or not, while it translates in barrel 15 during the injection of molding material into the mold. Also, for definitional purposes, the injection stroke of the molding cycle starts when molding material pushed by ram 14 leaves an open end 24 of barrel 15 (shut-off valve not shown) to initially enter mold cavity 23 and continues until mold cavity 23 is initially filled with molding material whereat the injection stroke ends. Further movement of ram 14 to supply additional molding material to mold cavity 23 to account for volumetric contraction as the molding material solidifies is regulated by the packing phase of the molding cycle through a different control arrangement than that used for controlling ram movement during injection.

Movement of piston 16 which, in turn, directly controls translational movement of ram 14 is controlled, in the preferred embodiment, by a directional proportioning valve 25. Again, FIG. 1 is a schematic. In actual operation, an injection manifold which includes, but is not limited to, valves controlling output of an injection pump(s) is typically provided. Similarly a separate manifold may be provided for valves controlling clamp mechanism 12. However, in each of these manifolds, a separate proportioning valve is used in the preferred embodiment. Specifically, in the preferred embodiment, proportioning valve 25 is flow controlled only. It is customary for proportioning valves to separately regulate both pressure and flow. Because of the pump size, the high torque output of the motor driving the pump and other considerations, pressure does not have to be separately controlled (other than by a conventional safety relief valve). Accordingly, in the schematic of FIG. 1, a constant delivery pump 26 is driven by a motor 27 with the pump 26 having a capacity and motor having a horsepower such that flow control by proportioning valve 25 will control velocity of ram 14. Constant delivery pump 26 is provided with a conventional safety relief valve 28 connected to sump 29.

A machine controller 30 controls the operation of injection molding machine. Machine controller 30 essentially comprises an operator console or station 32 at which the operator enters data or set points defining how the machine is to be operated and a programable logic controller, PLC 34, which receives the operator instructions and data from sensors on the machine, processes the data and generates driving signals to actuators on the machine. Insofar as the present invention is concerned, the machine has a ram travel position sensor 35 generating a transducer signal on a ram position sensor line 35a. Thus, the exact position of ram 14 schematically indicated by arrow 36 is sensed at real time and an internal clock within PLC 34 allows PLC 34 to track ram travel positions at timed increments to generate observed velocity signals. Alternatively, hardware differentiation could be used to obtain an input analog velocity signal. In response to operator set velocity points and the observed ram travel positions, PLC 34 will generate an analog drive signal on drive signal line 37 to a solenoid valve controlling the operation of proportioning valve 25. As noted above, by controlling the amount at which proportioning valve 25 is opened or closed, the rate of flow of oil from pump 26 is regulated to control the speed of piston 16 and ram 14. The injection molding machine is also equipped with a sensor 38 for sensing the pressure exerted by ram 14 on the melt and generates a pressure signal on line 38a to PLC 34. Additionally, the injection machine is optionally fitted with a pressure sensor (not shown) sensing the pressure of the melt in mold cavity 23 and generating a pressure signal on mold cavity pressure signal line 39 to PLC 34. Conceptually, the pressure sensors can be used as a substitute for the ram travel position sensor or as an additional signal to control the velocity of ram 14. The components thus far described, as components, are conventional.

Figure 3:
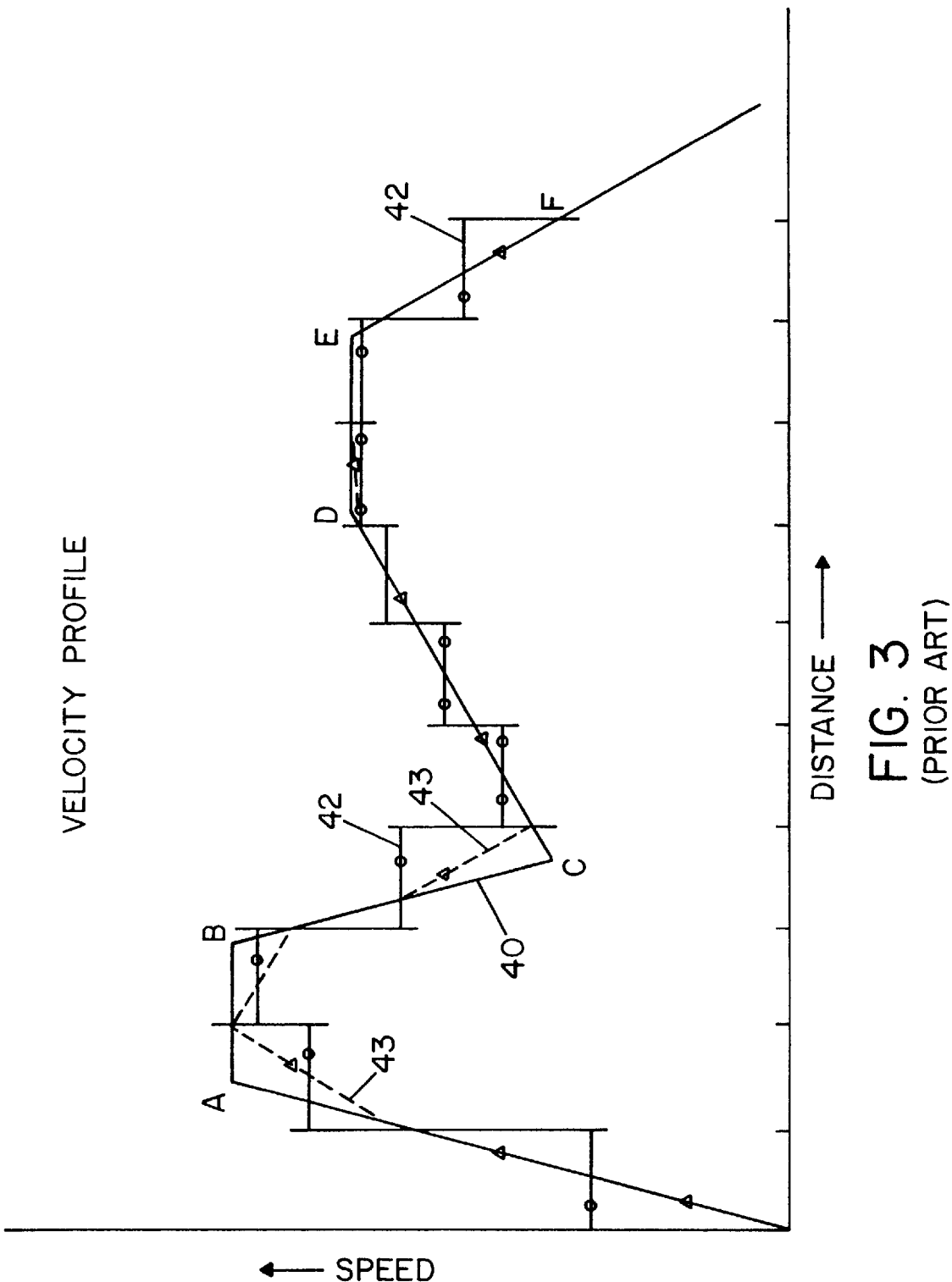
FIG. 3 is a graph indicative of a velocity profile screen illustrating prior art concepts.

Referring now to FIG. 3 there is generally depicted a velocity profile graph 40 such as what appears on the velocity screen which the machine operator can call up at operator station 32. The screen or graph displayed plots the travel distance of the ram on the x-axis and the speed of the ram on the y-axis. Typically, the operator sets desired ram velocities at desired ram travel positions up to a maximum of about 10 or 11 set points. The operator set points are shown by reference letters A, B, C, D, E, and F in FIG. 3 and if the points are connected by straight line segments as shown, velocity profile curve indicated by reference numeral 40 can be drawn. Conventional controls observed in use today divide the ram travel into equally distant zones typically 10. Early controls set constant speed for the ram in each zone. For example, an average speed for each zone representing the mid-point of the velocity profile curve in each zone could be used to set the ram speed for that zone. A profile curve such as shown by graph 42 passing through circles would result. So long as the velocity profile was not significantly changing in speed, a reasonable result would theoretically occur. The constant speed zone approach was subsequently improved by setting velocity points at the zone boundaries and ramping the speed of the ram between the boundary set points. This would theoretically produce an actual velocity profile curve designated by reference numeral 43 passing through triangles on dash-line shown. So long as the set velocity profile was gradual, or the set points changed at the boundary zones, a reasonably close velocity profile could theoretically result. However, if there was an abrupt change in the velocity such as at points "AA" and "IC", the ram would not emulate the user set points. The discussion is theoretical thus far and assumes that the ram can, in fact, match the velocities of the set points. In practice, this has not been observed on a consistent basis. In fact, several of the patents discussed in the Background utilize techniques in which the ram travel at one portion of a given zone would be conducted on an open loop basis and then would switch to a closed loop control sometime during traversal of a given zone. Additionally, it should be noted that during operation, the operator display will show a trace of the actual velocity of the ram superimposed over the velocity profile set in FIG. 3. Graphs 42, 43 show theoretically what the velocity profiles of the ram would be if the machine would actually meet the set points established by the control systems. Graphs 42, 43 simply show that current control systems cannot, depending upon the velocity profile set, theoretically meet the set velocity profile curve 40. In actual practice, the velocities of the ram does not follow the zone set points entered by the machines' control. To some extent, there is simply an actual physical limitation on what the equipment can do. For example, point C on velocity profile curve 40 is a sharp transition from a rather steep deceleration to a gradually increasing acceleration set at point D. If the curve rise between point C and D is steep, the machine cannot emulate the velocity profile at point C. Apart from this, the problem is that the control simply doesn't cause ram 14 to meet the set points.

The injection molding machine is a complicated machinery item composed of many systems and subsystems. It has been observed that identical machines, manufactured with the same components (all of which are supplied under tight quality control procedures) having the same capacity and model designation will not produce the same velocity profiles for identical parts manufactured on the same machines due to the variations between valves, pumps, motors, etc.

One of the underpinnings of the invention then, is the recognition that the variations between identical machines must first be addressed before an acceptable control model or law can be applied. That is, velocity profiling is a two-step problem. This invention solves both problems but it should be recognized that resolving the first problem is to some extent independent of the second problem, i.e., the control law. That is, any control law could be developed to represent an improvement over existing systems provided that the first mentioned problem is addressed.

The invention addresses the first problem by machine setting the control system to account for any variations attributed to a specific machine so that the machine can accurately reproduce the velocity profile when it is not under load. By setting the machine to accurately reproduce the users set velocity profile when the machine is not under load, a reference base is established upon which a control law can be modeled to account for the disturbances and resistances encountered by the ram when injecting a shot of melt into the mold. Clearly, if the reference condition cannot be established, the soundness of any control law used by the machine when under load cannot be evaluated.

All PLC control systems on injection molding machines develop digital control signals which are converted into a varying voltage analog signal in a d/a converter. In developing a digital velocity signal, some feedback information as to the ram position and/or the ram velocity has to be inputted into the PLC. As noted in the Background, this feedback information takes the form of an error signal modifying the set point signal to produce the digital velocity control signal which in turn generates the analog drive signal. Typically, a PID controller is used within the PLC to produce the velocity control signal. Conceptually then, the machine set up requires a) the voltage signal controlling proportioning valve 25 be coordinated with the digital velocity set points entered by the end user into the machine and b) the PID controller be tuned to produce accurate responses to the set point signals. As indicated previously, setting the speed and the responsiveness of the machine to speed changes was manually done by the technician during machine set up. (When the machine aged, either the manufacturer's technician or the machine operator has had to manually recalibrate.) The solenoid voltage operating proportioning valve 25 is manually adjusted until the ram is first observed to move and that voltage was recorded as a valve offset digital signal within PLC 34. The voltage was then manually changed until ram travel at maximum rated speed was observed and that voltage level was likewise recorded in lie PLC 34 as the span voltage. The straight line between the two points establishes then a digital setting for any speed of the machine. The technician would then boost the speed of the ram during injection to observe how quickly the PID controller responded. Various manual adjustments to the PID loops were made until the technician felt the PID controller caused the ram to exhibit a quick speed change, i.e., "rise".

Figure 4:
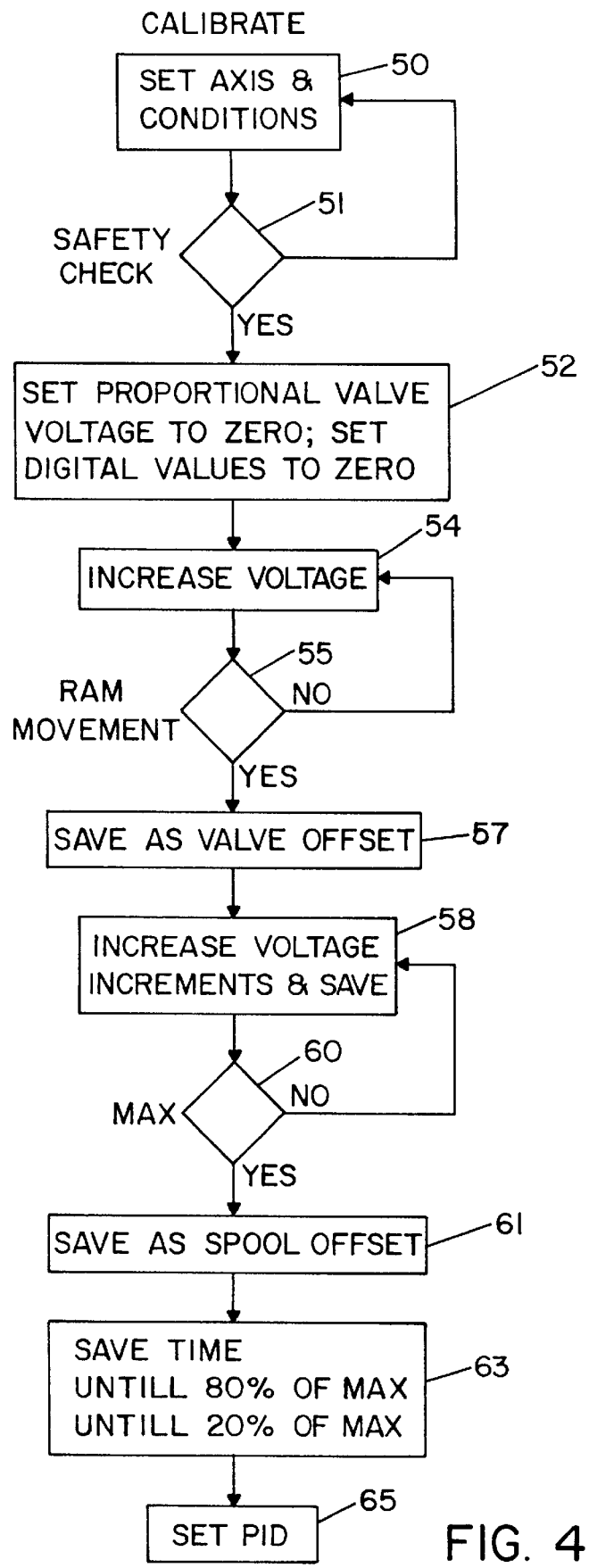
FIG. 4 is a flow chart showing steps undertaken to calibrate the machine in accordance with the present invention.

The present invention automatically or machine calibrates the control system and follows the flow chart diagramed in FIG. 4. Essentially, the automatic valve calibration procedure involves applying a sequence of test voltages to the machine and observing the response. The nature of the test voltages and their sequence is specific to the valve being calibrated, however, the following general steps are taken for each valve. First, the machine's ram axis is set or aligned and other machine conditions are set such as whether the machine is operated in a normal mode or in an energy saving mode at block 50. This is followed by a safety check at block 51. At block 52, the machine (factory calibrated at zero voltage) sets the solenoid valve voltage for proportioning valve 25 at zero and a digital velocity values in the PLC are set at zero. While the remaining steps of the calibration process can be done manually with verification from data observed on the screen at operator station 32, a calibration program is written using data acquired from ram travel position sensor 35 on line 35*a*. Controller 30 causes voltage to be slowly increased at increasing voltage block 54. When ram movement is sensed by ram position sensor 35 at block 55, voltage increase at block 54 is stopped and the digital setting recorded in the machine's memory as valve offset at block 57. The digital values are at some value at valve offset voltage and those values are incrementally increased in ten percent increments (in the preferred embodiment) and the steady state ram speeds detected by ram travel position sensor stored in memory at each incremental voltage increase. The digital voltage signals are incrementally increased until the maximum rated ram speed of the machine is detected at block 60 and the value at maximum ram speed is saved in memory as the spool offset value at block 61. Again, the speeds detected are steady state speeds and the settings are achieved automatically by the machine although, a similar procedure could be followed manually but without the accuracy achieved by the machine settings. A digital velocity control signal setting correlated to ram speed can now be set in the control's memory by constructing a graph passing through the incremental voltage points from offset to valve span. In practice, the relationship is linear and a straight line passing through max (spool offset) and min (valve offset) is constructed (and verified by the incremental voltages recorded at block 58 which may shift the line). The machine can now produce a steady state speed equal to any speed set by the user in an unloaded condition.

With the machine now able to produce, without load, constant speed at any given velocity set point, the PID controller is tuned. Specifically, the time it takes for the machine to reach a velocity, the rise time, is again recorded by ram position feedback sensor 35. That is, with the ram at rest, the maximum rated speed is set and the time on the display screen as the speed increases until a set speed is reached is recorded. In the preferred embodiment, time measurements for the ram to reach twenty percent of maximum rated travel and the time measurement for the ram to reach eighty percent maximum travel is recorded at block 63. The time values are then used to tune the PID at block 65.

Generally, digital routines are used to set PID analog gain values for the proportional, derivative and integral loops. The digital routines follow known tuning methods such as CDHW or Ziegler-Nichols based methods. Essentially, two of the loops have their gains reduced to zero while the third loop's gain is incrementally increased until a set rise time is observed. The other loops have their gains set as a ratio of the set loop and the machine's rise time finally verified. Alternatively, after the first loop is incrementally adjusted, the second loop is incrementally adjusted in gain until a second rise time is observed. Then, the final loop is incrementally adjusted until the rise time recorded at 20% and 80% meets set time periods. Again, the process is done automatically through a programmed routine. If the machine is equipped with an energy savings mode, the auto tune procedure is repeated-with the machine set for the energy savings mode. As the machine ages, periodic recalibrations are done.

Figure 3A:
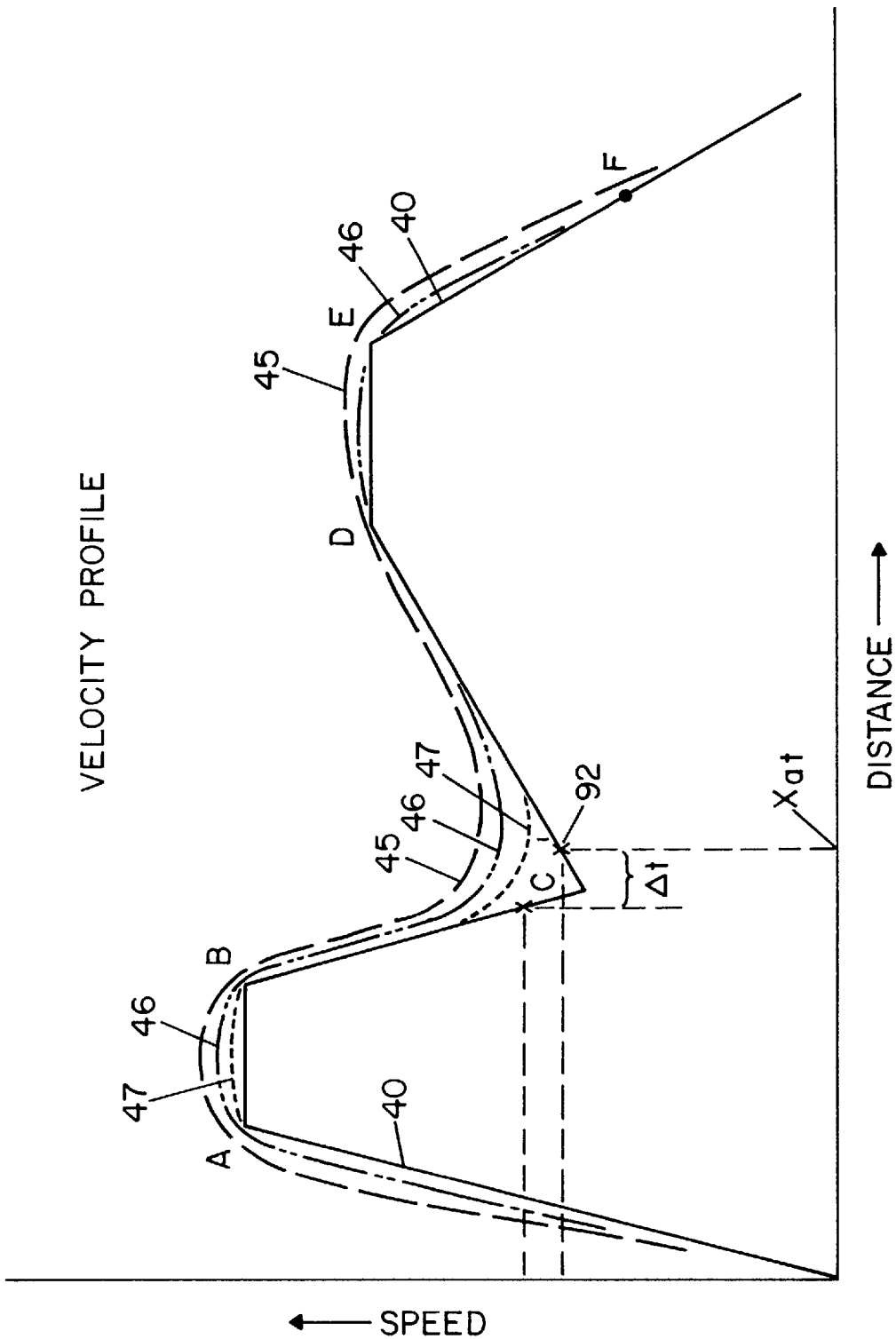
FIG. 3A is a graph indicative of a velocity profile screen similar to FIG. 3 illustrating concepts used in the present invention.
Figure 5:
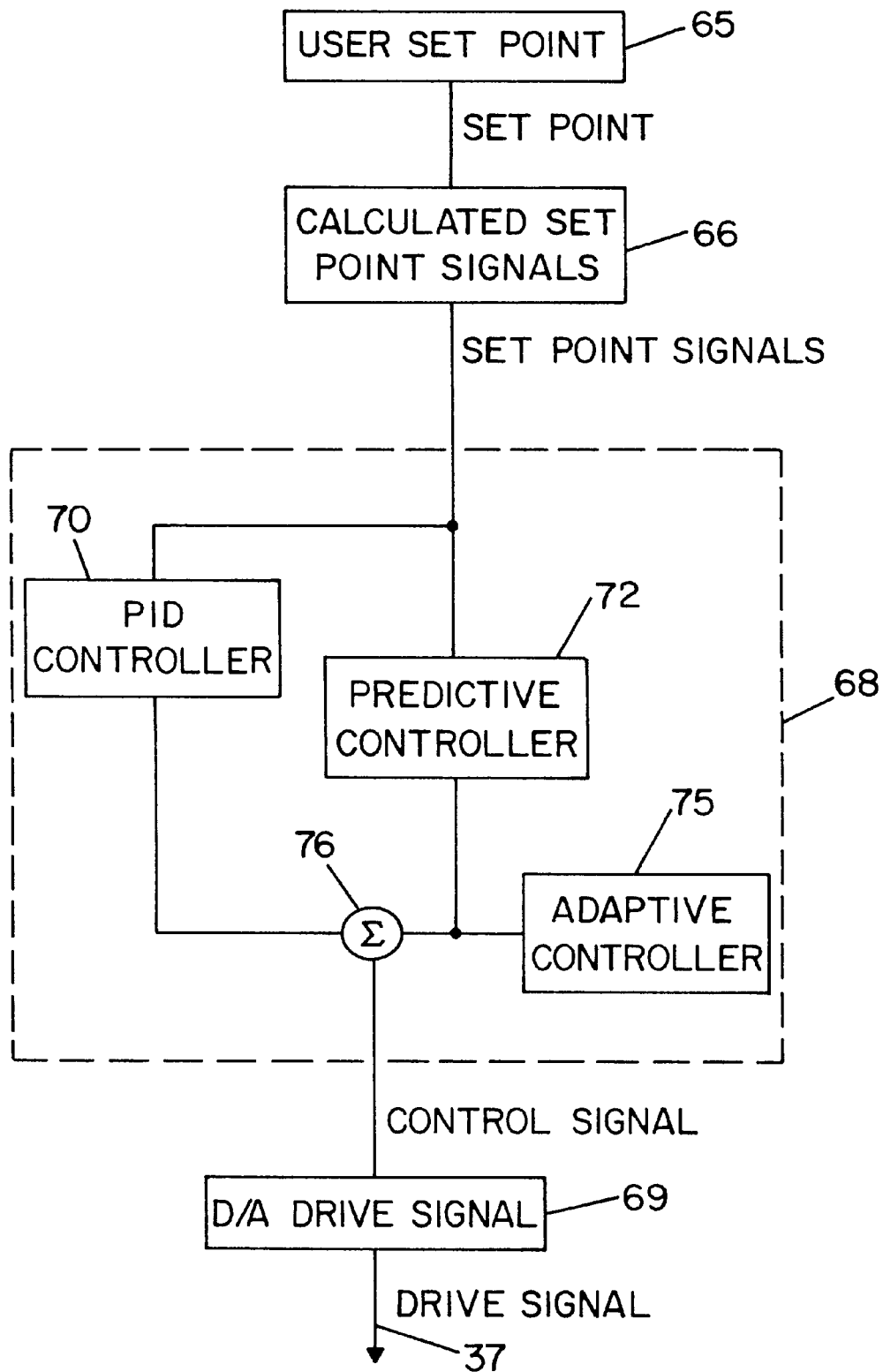
FIG. 5 is a block form schematic illustrating general processing of ram velocity signals in the invention.

Referring now to FIG. 5, there is shown the general process steps by which the drive signal is generated on drive signal line 37. As already discussed, the operator at operator station 32 enters a plurality of what is termed "user set points" at a user set point block 65. The user set points are indicated by reference letters A–F shown in FIG. 3A and indicate desired ram speeds at specific ram travel distances. After the set points are entered at block 65, PLC 34 calculates approximately one thousand set point signals at set point signal block 66. If the distance axis shown in FIG. 3a is divided into one thousand equal increments, PLC 34 will, for each increment, calculate a speed such that a locus of loop points equally spaced along the distance axis will have a set velocity for each point to define velocity profile graph 40. In practice, line segments between the reference letters are connected by straight lines. However, given the large number of ram velocity/ram distance set points calculated by PLC 34 (which in the preferred embodiment are approximately one hundred points per inch), form fitting curves of set point signals are possible. When mold flow analysis demands such profiles, the control system of the present invention will be able to duplicate such profiles. Presently, and in the preferred embodiment, the velocity profile set signals are simply generated according to the straight line equation y=mx+b for set point signals lying between adjacent set point reference letters. In fact, earlier versions of the control system simply mapped out an array of set point signals which was then accessed by a lookup table to develop a straight line velocity profile curve of FIG. 3A. The present invention contemplates, as an alternative embodiment, accessing a plurality of velocity/ram distance signals from a data map of such signals vis-a-vis lookup tables to generate a velocity profile curve 40. In either embodiment, the plurality of set point signals is significantly larger than the plurality of user set points. Again, because the preferred embodiment calculates each set point signal in the velocity profile, higher order velocity profile curves can be generated as well as straight line profiles. Still further, it is possible to take the velocity profile set point signals in block 66 and modify them by the calibration factors set in FIG. 4. In the preferred embodiment, the calibration factors are applied to the set point signals as the control signals are developed in accordance with the control law of the present invention.

The set point signals are then converted into control signals in control signal block 68. Control signal block 68 is shown in greater detail in FIG. 6 with its inner loops and with its outer loops in FIG. 7. The control signals developed are then converted into analog drive signals through D/A drive signal block 69. The analog drive signal as explained is inputted on drive signal line 37 to proportioning valve 25 in the preferred embodiment. Alternatively, the control signals leaving control signal block 68 can be inputted as the drive signal to an electric motor if the injection molding machine had an electric drive. For example, if conventional ball screws were used as the drive in lieu of piston 16, the speed of the electric motor driving the ball screw would be controlled by the control signals from control signal block 68. Still more specifically, if the motor driving ball speed was an AC induction motor, then the reference speed signal inputted into the vector control for such AC induction motor would be the control signal emanating from block 68. Reference can be had to U.S. Pat. No. 5,362,222 (incorporated herein by reference) which discloses a vector control for an AC induction motor driving a ball screw causing translation movement of the ram. The vector control needs an input signal to drive the motor. The input signal is the control signal developed by this invention.

Within control signal block 68 are three control signals, namely, a closed loop, real time control signal developed by a PID controller 70, an open loop predictive control signal developed by a predictive controller 72 and an adaptive control signal developed by an adaptive controller 75. While the machine has the capability of running closed loop or open loop or open loop with adaptive control, in the preferred embodiment, the control signals from all three controllers are simply summed at 76 to produce the final control signal.

The control law of the invention can be stated as:

Control Signal=PID Control Signal+Predictive Control Signal+ Adaptive Control Signal which can be rewritten as:

$$u(t)=PID(t)+OL(f(t))+L(f(t))$$ Equation 1

Where:

$$u(t)=\text{Control Signal @time } t$$ Equation 2

$$PID(t) = P \cdot \{y(t) - r(x(t))\} + I \cdot \int_0^t \{y(\tau) - r(x(\tau))\}d\tau + D \cdot \frac{d\{y(t) - r(x)(t))\}}{dt}$$ Equation 3

$$OL(\theta(t))=\text{Span} \cdot r(x(t+h))+\text{Offset}$$ Equation 4

$$L(f(t))=L(x(t+h))$$ Equation 5

Figure 6:
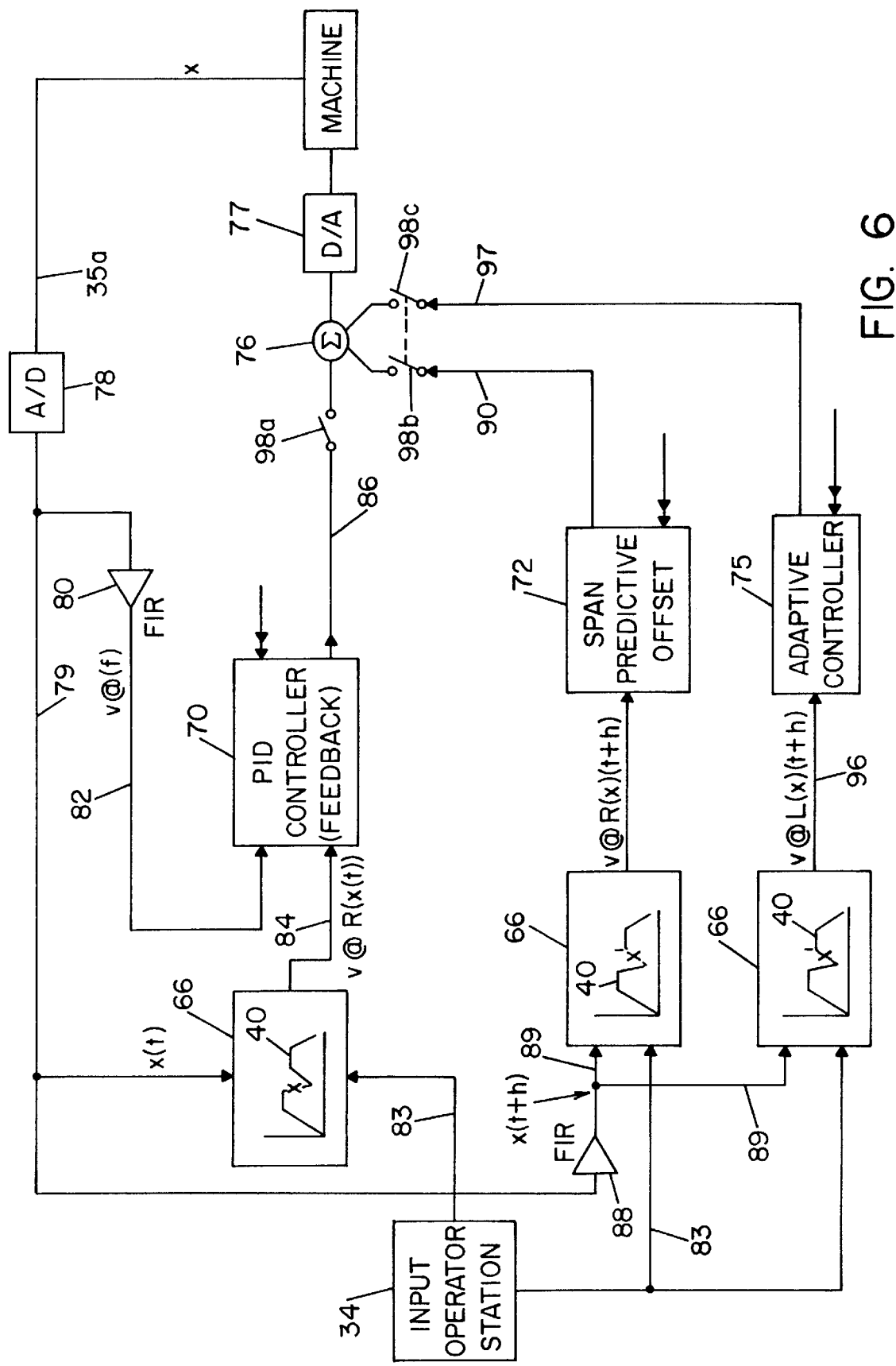
FIG. 6 is a schematic, block form diagram showing inner control loops used in the present invention.

Referring now to FIG. 6, there is shown in greater detail a schematic better illustrating the control law described above. As already discussed, ram position feedback sensor 35 generates a continuous analog signal on line 35a indicative of the actual ram position at current or real time. The real time analog ram position signal is digitized in an analog to digital converter 78. The control system is equipped with a conventional timing circuit and the digitized, real time position signal x(t) on line 79 is converted to a real time velocity signal at velocity conversion block 80 which includes a finite impulse response filter. The finite impulse response filter is used to generate the real time velocity signals based on current and past timed ram position events. The real time velocity signal is inputted to PID controller 70 on line 82.

As already explained with reference to FIG. 5, input set points from operator station 34 are sent by input set point line 83 to set point signal calculator 66 which takes current ram position x(t) from ram position line 79 and develops a real time velocity set point signal, v@R(x(t)), on set point signal line 84. The velocity set point signal is taken from velocity profile curve 40 at the real time position x(t) as schematically indicated by reference letter "x" shown on graph 40 depicted in set point signal calculator 66. The velocity set point signal on line 84 is summed with real time velocity signal on line 82 to produce an error signal which is processed by the proportional, integral and derivative loops of PID controller 70 in a well known manner to produce a closed loop velocity control signal on line 86. In the preferred embodiment, the calibrated span and offset settings are not applied to the real time set point velocity signals since the error signal is what is processed by PID controller 70. However, as noted from the discussion above, the calibrated valve settings can be applied to the real time velocity set point signals.

Real time position signal x(t) on real time line 79 also passes through a finite impulse response filter 88 whereat it becomes a predictive position signal x(t+h) on predictive position line 89 which is passed through set point calculator 66 to produce a predictive set point velocity signal, v@R (x)(t+h). The predictive set point signal is then passed through predictive controller 72 which modifies the advanced set point signal by the calibration values discussed above to produce a predictive velocity control signal on line 90.

Finite impulse response filter 88 uses current real time data with respect to past observed data to determine a distance that the ram traveled attributed to the response latency or lag of the entire system. This includes control "jitter", as well as response latency of the proportioning valve, system momentum, etc., all of which are included in the term "response latency". The distance traveled by ram 14 attributed to response latency is calculated by finite impulse response filter 88 and added to the real time position of ram 14. This advanced travel position shown by the reference letter x' in FIG. 6 (and also in FIG. 3A) is the position used in set point signal block calculator 66 to generate the advanced set point velocity signal at the advanced position of velocity profile 40.

Figure 8:
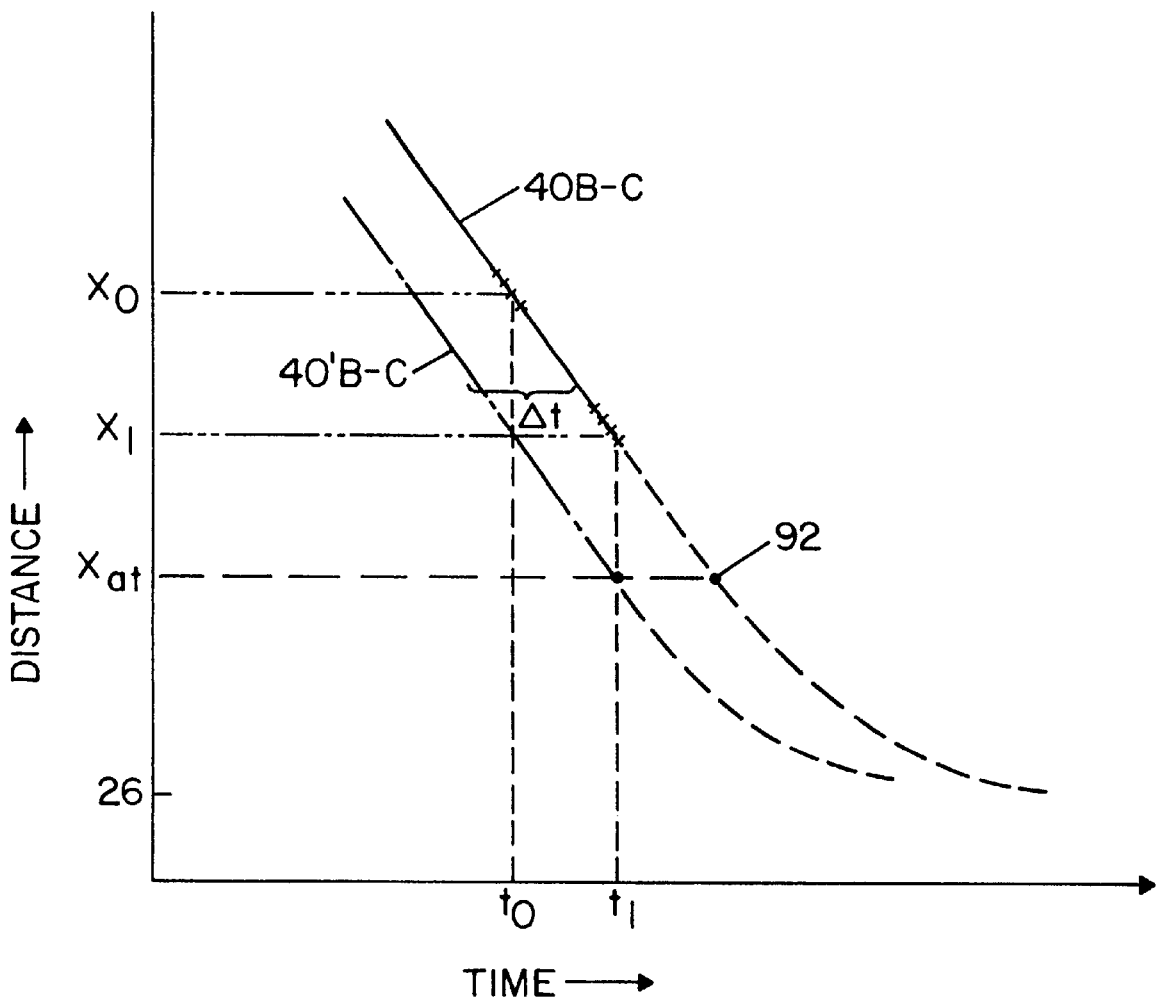
FIG. 8 is a graph of distance versus time similar to FIG. 6 of my U.S. Pat. No. 5,493,503 patent but showing ram distance traveled over a time period; and, FIG. 9 is general schematic in block form of portions of the analog and sequencer cards illustrated in the control system of FIG. 2.

The mathematics by which finite impulse response filter 88 calculates the predictive position is straightforward. Distance equals rate times time. Referring to FIG. 8, rate is the slope of velocity profile curve 40 at any given time and a portion of velocity profile curve between reference letters B & C is depicted as a solid line ending at a real time position $t_1$ with future positions of velocity profile curve 40B–C shown as a dash line extending therefrom. Rate is the slope of solid line 40B–C, i.e., velocity, and can be expressed as:

$$x' = \frac{x_1 - x_0}{t_1 - t_0} \qquad \text{Equation 6}$$

where $x_1$ is the current position of ram 14, $x_0$ is a previous position of ram 14 at time $t_0$, $t_1$ is the time at which the current position of ram 14 is being sensed, $t_0$ is usually 50 milliseconds prior to the current time $t_1$.

The predicted position $x_{at}$ at the advanced time $\Delta t$ corresponding to the lag time (such as response latency) can be written as:

$$x_{at} = x_1 + x' \Delta t \qquad \text{Equation 7}$$

Equation (6) can be rewritten into the following form:

$$x_{at} = \left(\frac{\Delta t}{t_1 - t_0} + 1\right) \cdot x_1 - \left(\frac{\Delta t}{t_1 - t_0}\right) \cdot x_0 \qquad \text{Equation 8}$$

which, in turn, is the classic finite impulse response filter form of:

$$x_{at} = a_1 \cdot x_1 + a_2 \cdot x_0 \qquad \text{Equation 9}$$

where:

$$a_1 = \frac{\Delta t}{t_1 = t_0} + 1$$

$$a_2 = \frac{\Delta t}{t_1 = t_0}$$

Equation 9 predicts at the current time the position ram 14 will be at after the response latency has been taken up. If the graph of a plurality of $x_{at}$'s taken over a period of time were plotted, the dot dash line designated by 40'B–C would be generated and 40'B–C would be parallel to 40'B–C (assuming constant velocity and accurate sampling) but offset or advanced therefrom a time lag-equal to $\Delta t$. Line 40'B–C would intersect any ram position point at a time, $\Delta t$, earlier than ram 14 would actually reach that ram travel position. The finite impulse response filter takes and advances the input signal to a predicted position which is compared to the actual position and the position is calculated by analyzing the past and current positions of ram over time to determine how far ram 14 will travel during the response latency of the control or other system variables. It should be appreciated that the calculation is not complex and can be quickly processed by the processor (less than 0.75 milliseconds in the preferred embodiment). This makes the control system responsive and accurate. Further, it is to be appreciated that the advance position will vary because the ram speed is not constant. That is, not only is velocity profile 40 set to be at varying velocities, but within each straight section of velocity profile 40 the ram velocity will meander and be subject to random variations (noise) as it travels past various position points. To produce a straight profile and permit accurate use of a finite impulse response filter, there are numerous machine calculator velocity set point signals, i.e., 1000. At each calculation, several points at $x_1$ and $x_0$ are taken and averaged (in the preferred embodiment, four adjacent points are averaged) By taking an average number of closely spaced set points at very fast intervals, predictive ram positions $x_{at}$ will closely and accurately follow velocity profile curve 40. This is shown at an exaggerated position in FIG. 3A. In general summary, a large number of set points enable fast FIR sampling to produce predictive position set point signals to carefully follow velocity profile curve 40 from which the desired set point velocity signal can be set. Again, unlike other feed forward techniques, the signal x is simply not being outputted directly but takes into account the upcoming events to generate a new signal from the velocity profile. The velocity signal at x' based on a predictive distance calculation is used to establish the control signal. This control signal when modified by the valve calibration settings in predictive control block 72 will now produce an open loop signal which can carefully and precisely control the velocity of the ram without load. As noted above, many injection molding machines use constant delivery pumps and the velocity of the ram is controlled by controlling only the flow from the pump because the pump pressure is more than sufficient to provide necessary torque. In practice there are many small load type molding applications where the machine in normal operating mode (and not energy saving mode which limits the output capacity of the pump) can process the molded part with only the predictive open loop. That is, the load disturbance does not significantly affect the ability of the machine to travel at calibrated "no load" velocities. The error signal generated from PID controller 70 as a closed loop control signal is saved for each real time ram position whereat it is generated in a look-up table. Thus at the completion of each injection stroke, there is generated a look-up table of error correction factors for the velocity profile 40 of the immediately preceding injection stroke. This look-up table is combined with the real time error correction signals which are generated during a current injection stroke. In practice only a percentage of the error signal, say 50%, is added to the look-up table. Also, the table modification continues only for a limited number of molding cycles. In the preferred embodiment, the table modification stops after eight cycles. The error correction look-up table is shown diagrammatically in FIG. 7 as disturbance look-up table 95. The disturbance look-up table is thus a memory of the disturbance or load for each point along velocity profile curve 40. Physically, the load during the injection stroke is due to the resistance of the plastic to flow and it changes considerably during the injection stroke as the plastic freezes along the runners and as the melt front passes through obstacles and turns in the geometry of the mold. The effect of the adaptive control on the actual produced velocity profile traced is schematically represented by trace 45 which is the first molding cycle, trace 46 which is the second "learned" molding cycle trace and trace 47 which is the third "relearned" velocity profile trace.

Referring now to FIG. 6, the predictive position signal, x(t+h) on predictive position line 89 and the set point on line 83 is sent to calculated set point controller 66 to develop a disturbance, velocity set point signal, v e L(x)(t+h), on line 96 sent to adaptive controller 75. Adaptive controller 75 accesses disturbance look-up table 95 to generate a disturbance control signal on line 97. Recall that predictive controller 72 sets the velocity control signals accounting for the response latency of the system with the system not under load. Adaptive controller 75 sets velocity control signals which account for the load. The only way the load can be accounted for is to observe what resistance the load imposes on ram 14 during the injection stroke. That observation is conveniently but accurately made by the error signal generated at PID controller 70. Thus a predictive, open loop velocity control signal is generated which is customized for each individual machine by the calibrated, no load control signals and for each particular molded part by the disturbance control signals.

In the preferred embodiment all the velocity control signals are summed at summing juncture 76 to produce the composite driving signal sent to digital to analogue converter 69 for developing the drive signal sent to proportioning valve 25. In summary of the three terms of the control law of the invention, first the predictive open loop signal is output to generate a speed signal which, absent of all loads and disturbances, would produce a speed trace which matches the users' desired speed profile as close as possible as a result of the automatic calibration. Next the load memory or disturbance term is summed in to compensate for mold geometry and machine load changes which naturally occur during the injection stroke. This now produces an output which compensates for any consistent load changes. Finally, the traditional PID loop is then run on any remaining error (i.e., inconsistent disturbances resulting from shot to shot variations) using terms that were set during the automatic calibration. The control system with all terms implemented as described has produced noticeable improvement in velocity control over all other known systems in use on injection molding machines including significant improvements in following error, rise time, overshoot, and other measurements of injection boost closed loop performance.

In the preferred embodiment, the control system can be operated with all three control signal terms of the control law implemented as just described. Alternatively, the control system can be operated simply closed loop, or open loop or open loop with adaptive control. This is easily accomplished by simply summing in the desired velocity control signal factors making up the control law defined above. It is schematically shown in FIG. 6 by switches designated 98a, 98b and 98c connecting the control signals to summing juncture 76. A dotted line is shown to indicate that switch 98c can be optionally activated only when switch 98b is activated. Closing all switches activates all the terms of the control law so that the control operates as described. Closed loop control occurs by closing switch 98a and opening switches 98b and 98c. Open loop predictive control without adaptive control occurs by closing switch 98b and leaving switches 98a and 98c open while open loop predictive adaptive control occurs with switches 98b and 98c closed and switch 98a open.

Figure 7:
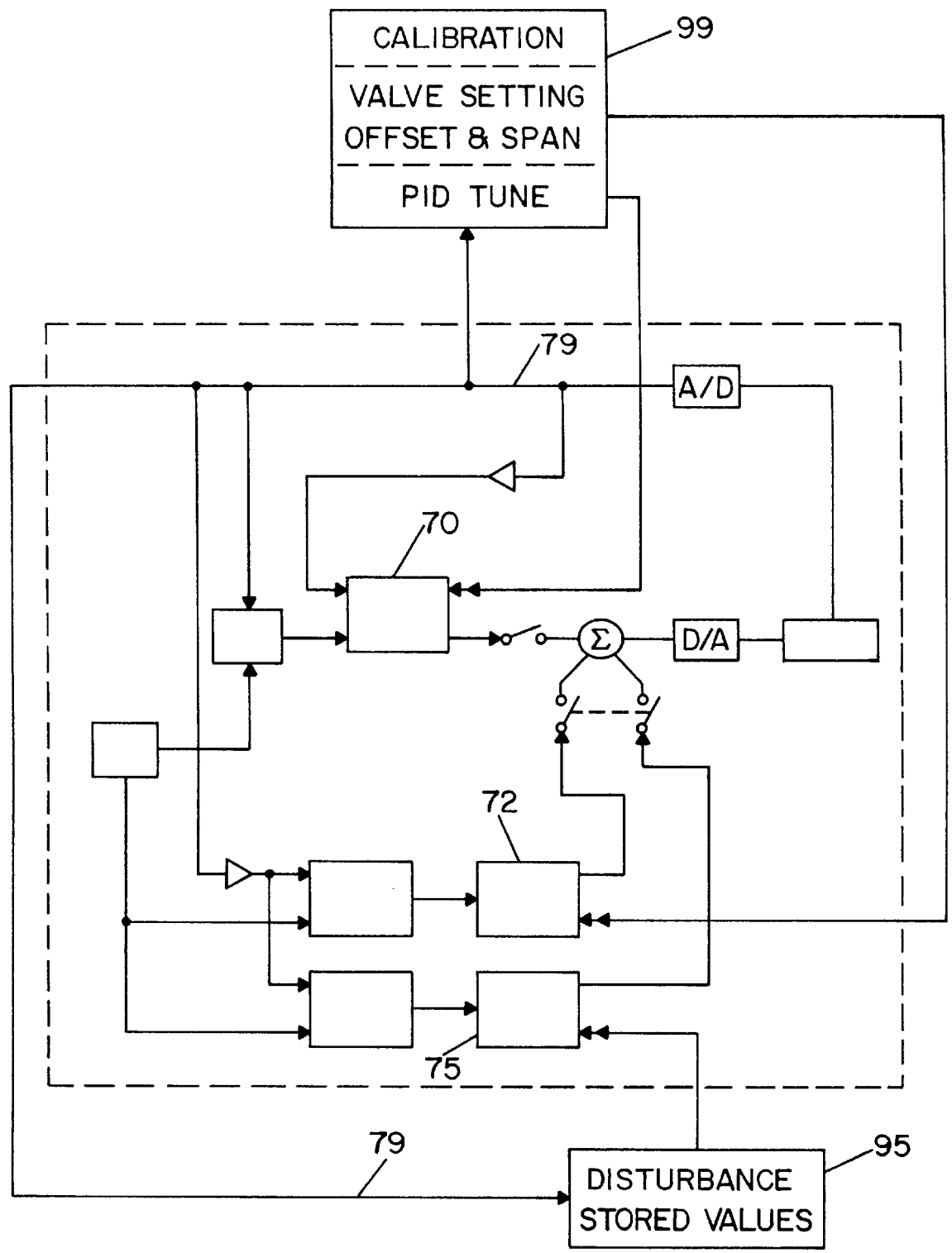
FIG. 7 is a schematic diagram similar to FIG. 6 but showing the outer control loops.

Referring know to FIG. 7, there is shown the outer control loops for the inventive control system which were not shown in FIG. 6 for drawing convenience. The calibration settings/routines described with respect to calibration steps in FIG. 4 are performed and stored in calibration routine block 99. As shown the real time ram position signal on line 79 accesses calibration routine block 99 so that the PID gain terms for that real time signal can be set by the tuned settings for the PID loops established at calibration. Similarly the real time ram position signals are also inputted to disturbance look-up table 95 so that the error signal developed by PID controller 70 can be stored at the proper ram travel position.

Figure 2:
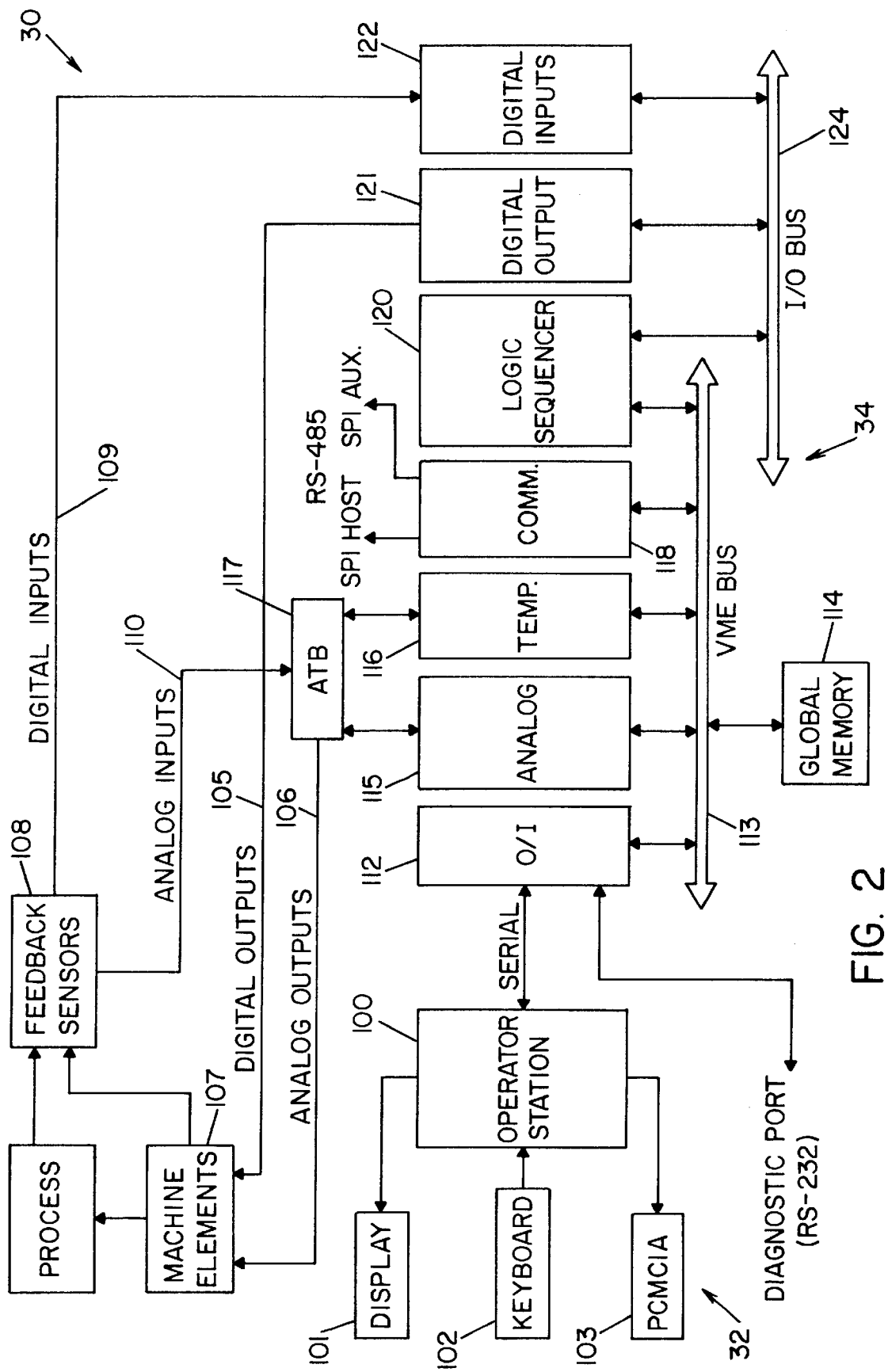
FIG. 2 is a general schematic of the control system used for the injection molding machine shown in FIG. 1.

Referring now to FIG. 2, there is shown a general schematic of machine controller 30. In the preferred embodiment, controller 30 is the assignee's Pathfinder controller, specifically Pathfinder series 3000 or 5000. Operator station 32 includes an intelligent (CPU) operator station board 100 with memory communicating with a display unit 101, a key board 102, whereat the operator inputs mold cycle instructions and a PCMCIA slot 103 which is typically used to extract mold cycle run data for SPC, storage and other purposes. Insofar as the invention is concerned, data is inputted either through key board 102 or PCMCIA slot 103 and the CPU in operator station board 100 converts this data into machine instructions which is sent to PLC 34 for processing. In addition, operator station board 100 receives machine data from PLC 34 and outputs it to PCMCIA slot 103 and/or to display 101 through a video signal display card under the control of the operator station CPU. The video display 101 also displays input data as well as output data. Insofar as the injection stroke is concerned, the set points are typically entered by the operator at keyboard 102 and are converted into machine signals sent to PLC 34 and are also sent to the video signal display card within operator station board 100 where the entered data shows on display 101. From routines stored in the operation station's memory, operator station 32 can construct the visual display of the velocity profile 40 shown in FIGS. 3 and 3A as well as other displayed information. Alternatively, velocity profile 40 could be constructed from PLC 34 and inputted back as machine signals for processing by the video signal display card. However, the actual sensed velocity shown as a trace superimposed on velocity profile 40 depicted in display unit 101 is generated from machine signals inputted to the video card from PLC 34.

The machine cycle signals are processed through PLC 34 which contains a number of boards, each of which is intelligent and carries its own memory and CPU(s). Generally, PLC 34 sends out digital output signals on line 105 and analog output command signals on line 106 (such as the drive signal on line 37 to proportioning valve 25) to a number of output devices such as valves, motors, pumps, solenoids, etc. shown by machine element block 107. The machines elements such as piston 16 and process sensors (such as ram travel position sensor 35) function also as feedback sensors shown by block 108 which can develop either digital feedback signals on line 109 or analog feedback signals on line 110 (i.e., line 35a in FIG. 1) to PLC 34.

The principal boards within PLC 34 is an output/input board 112 communicating with operator station board 100 through a serial link and with other system boards in PLC 34 through a VME bus 113 which, in turn, carries or accesses a global memory storage 114. Other boards include an analog processor board 115 and a temperature process board 116, both of which interface with an analog terminal board 117 receiving analog feedback inputs and generating analog outputs. PLC 34 also includes a communication board 118 carrying a processor allowing communication through SPI protocol with auxiliary devices connected to the injection molding machine such as robotic handling mechanisms. PLC 34 also includes a logic sequencer board 120 communicating not only with VME bus 113 but also with a digital output board 121 and a digital input board 122 through an input/output bus 124. Also, logic sequencer 120 has a high speed link (not shown) connected to analog board 115 for fast transmission of analog data simultaneously processed by analog board 115. Reference should be had to prior U.S. Pat. Nos. 5,493,503 and 5,456,870 which are incorporated by reference herein for a more detailed description and explanation of the workings of PLC 34 than that which will be described or set forth herein.

For the purposes of this invention, sequencer card 120 is the programmable controller containing the basic controls or programmable routines which control the molding cycle of the injection molding machine.

Figure 9:
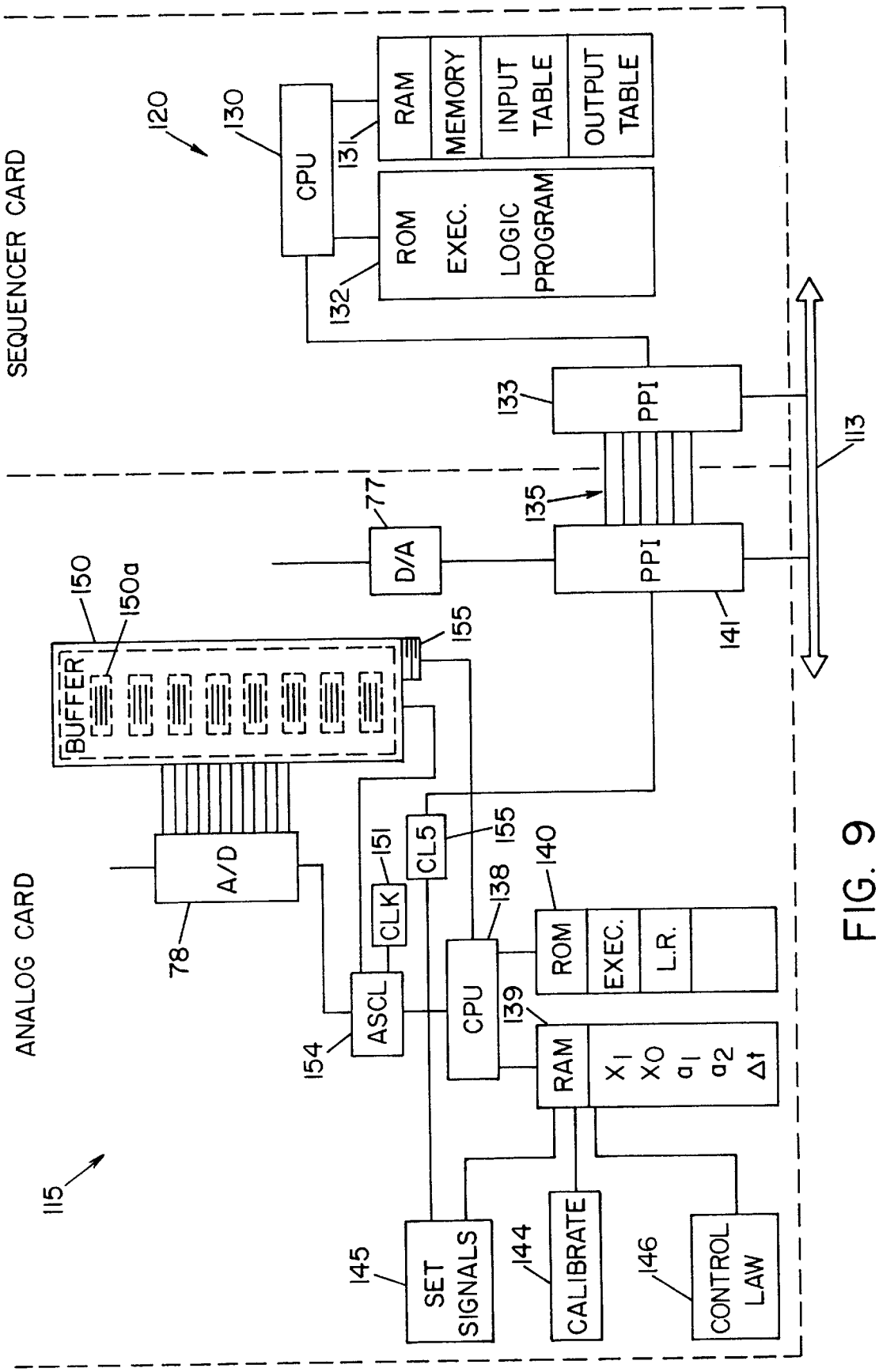

Basically, sequencer card 120 uses a number of data generated by the other boards of the PLC including the user instructions vis-a-vis operator station 32 and performs a series of logic instructions which i) determines the value of certain sensor inputs, ii) performs logic and numeric calculations based on the sensor information which can be time or count dependent and iii) determines certain output signals based on the sensor inputs which control the molding cycle. This user defined program executed by sequencer board 120 is periodically reviewed or scanned so that changes can be made to the output command signals and the molding cycle can sequence through its normal progression of events. As shown in FIG. 9, sequencer card 120 includes a CPU 130, which in the preferred embodiment is a Motorola 68000 16/32 bit processor operating at 12 MHZ frequency. Sequencer card 120 also includes RAM memory 131 which includes memory storage, input and output tables, etc from data or signals received from all the other cards and global memory 114 through VME bus 113 or the high speed link 135 (not shown in FIG. 2) vis-a-vis a programmable, peripheral interface 133 and ROM memory 132 which contains the execute program language stored in an execute logic program, which in the preferred embodiment is written in Motorola 68000 Assembly language. While some steps of the automatic valve calibration procedure described with reference to FIG. 4 are written in the "statement list" sequence command language stored in the logic program of ROM 132, for purposes of describing the present invention it can be considered that sequencer card 120 simply institutes the start and the end of the injection stroke while performing its scan of the program controlling the molding cycle performed by the injection molding machine.

Control of ram position and ram speed can be considered to be performed by analog card 115 (although, those skilled in the art will readily recognize that some functions can be performed by other cards within PLC 34). The development of the actual control signals is of course caused by software program routines, which apart from the general formulation of the control law defined above, do not, per se, form part of the invention although the invention must process the program to work. That is the programs, per se, are well known or readily apparent to those skilled in the art and can be generated by any skilled programmer given the functional parameters to be performed by the program as set forth herein. Accordingly, the programs themselves will not be described in detail herein.

Analog card 115, like sequencer card 120, has a CPU 138, random access memory RAM 139 and read only memory ROM 140. CPU 138 in the preferred embodiment is a Motorola 68000 16/32 bit processor operating at 12 MHZ frequency. ROM 140 contains the program routines, the execute instructions, and look-up, input, and output tables. RAM 139 contains the data calculated from routines stored in ROM which in turn may be stored in appropriate tables. Data is accessed from analog to digital converter 78 or from VME bus 113 or high speed link 135 through the analog card's programmable peripheral interface 141. Data is outputted through digital to analog converter 77 or to VME bus 113 or high speed link 135 through programmable peripheral interface 141. High speed link 135 is not utilized for velocity profiling signals.

Shown as separate blocks in analog card 115 is calibration block 144, set signal block 145 and control law block 146. Each block 144, 145 and 146 contains RAM and ROM memory with routines processed by CPU 138. Calibration block 144 stores data set from blocks 57, 58 and 61, draws a straight velocity/gain line through the data and then calculates the gain signal for any desired velocity on velocity profile 40 which is used by control law block 146 in developing the drive signal outputted to proportioning valve 25. Similarly, the stored values from block 63 in FIG. 4 are used to set gain values for the proportional, derivative and integral loops of PID controller 70 depending on the real velocity signals sensed by the control system. The gain terms for PID controller 70 are similarly sent to control law block 146 as well as to PID controller 70 through D/A converter 77.

Set signal block 145 accesses through programmable peripheral interface 141 global memory 114 which has, in machine language form, the user set points inputted at operator station 32 processed or sent by output/input card 112 to global memory 114. A routine in set signal block 145 generates the 1,000 set point signals or so from the user set points. As already discussed, adjacent user set points are interconnected as straight lines and the slope of the straight line used to assign set point signals at discrete travel increments. The set point signals are then stored in an output table for use by control law block as needed. Alternatively, set signal block 145 could have a map of velocity signals stored in look-up table form accessed to form the output table dependent on the user set points selected. Still further, calibration block 145 could be accessed to modify the output table by the valve gain settings developed for each set point signal in the output table.

Control law block 146 contain routines for performing the calculations for the three terms of the control law as defined above. The terms which are processed are triggered or activated by the user selecting open loop, closed loop, or open/closed loop as defined above. The user settings for control law block 146 are similarly stored in global memory 114 and accessed by control law block 146.

Use of finite impulse response filters are particularly important to implementation of the control law. As noted in the discussion with respect to FIG. 6, FIR 80 is used to develop the real time velocity signal and FIR 88 is used to develop the predictive position and velocity signals from position sensor 35. The ram travel position signal on line 35a, after passing through an anti-aliasing filter (not shown), and after passing through a multiplexer (along with all other analog sensor signals not shown or described herein because they are related to other operations performed by the machine) is converted into a digital signal at A/D converter 78 and the signal stored in buffer 150. Buffer 150 has a number of channels (eight in the preferred embodiment) with each channel storing information at timed intervals vis-a-vis clock circuit 151 for a specific sensor(s). The ram travel position sensor 35 signal is stored in channel 150a at every 0.25 millisecond time interval. Each channel stores 256 samples before sequentially overwriting the stored data. That is the 257th sample will overwrite the 1st sample. At every 0.75 milliseconds channel 150a is sampled. The current position signal and the immediately preceding 3 position signals (each of which preceded its "adjacent" in time signal by 0.25 milliseconds) are sampled, summed and averaged to obtain the real time signal $X_1$. Channel 150a is simultaneously accessed to obtain 4 adjacent signals stored 50 milliseconds earlier which are sampled, summed and averaged to obtain the past time signal $x_0$. The 50 millisecond time "spacing" was picked as a tradeoff between accuracy of the estimation of x' and the frequency of updating the calculation of x'.

With the $x_1$ and the x' terms of the FIR equation explained, the advanced time or $\Delta t$ is now applied depending on the use of the finite impulse response filter. That is, there is a delay time in processing the signal through PLC 34. That delay time is applied to correct the real time velocity signals sensed by ram travel position sensor 35. However, for the predictive sensor signal, there is a delay time in the response of proportioning valve 25 and so an additional set of calculations are performed for the valve delay. In addition there is a delay time attributed to momentum of the ram and a third set of FIR equations are performed to account for the delay attributed to system momentum. Thus one FIR filter (PLC delay) is used to determine the real time velocity signal. Three FIR filters (PLC delay, valve delay and system delay) are used to determine the predictive position signal. In practice, the three filters are combined into one filter doing all mathematical functions in one operation.

The FIR routines are performed (as are a number of routines for other analog based machine functions) by Analog Scanner Control Logic 154 which is conventional (as are all depicted components) and includes standard CPU instructions such as move/add/multiply to select and send appropriate sensor signals from the multiplexer (not shown) to A/D converter 78 for processing. The data is called out from channel 150a by ASCL 154 which includes, or has associated therewith, a memory address and offset generator, multiplexer channel counter, a scanner state controller and clock circuit 151. CPU 138 performs the finite impulse response calculations and in conjunction with a device select circuit 155 controls the selection and return of data by ASCL 154 from buffer 150.

In general summary of some of the major concepts utilized in the present invention, there is first an automated calibration method resulting in stored data, which is interpolated and calculated, to produce control signals which can consistently and reliably produce open loop control of ram velocity. Next, the system uses a machine generated, large plurality of set point signals from a limited number of user set points to provide a large number of control signals to replicate almost any attainable velocity profile desired by the end user. Significantly, the large number of set point signals generated by the machine allows for utilization of predictive filters (and similar concepts) which importantly, selects that velocity signal required by velocity profile at the advanced time. This provides an open loop signal which accounts for system lag in a manner far superior to that which can otherwise be achieved. To this predictive, open loop control an adaptive, load disturbance learned correction is applied. Thus while the initial open loop signal is set on the basis of a no load condition, the learned response attributed to the load, results in a corrected open loop signal within a few cycles. Therefore, the machine can control, open loop, any given molded part at velocity profiles more closely following the set profile than prior art closed loop systems.

Finally, actual load disturbances are sensed and accounted for by the traditional and familiar PID controller. While the use of a PID controller to account for the load disturbance is chosen in the preferred embodiment because of its ability to be tuned by the automatic calibration method disclosed and because of its familiarity with users of injection molding machines, other controls can be used in place of the PID control to account for actual, observed load disturbances and to produce the error signal used in the adaptive control. Specifically, the pressure sensed by the ram can be utilized to account for load disturbances. The pressure sensed by the ram is a direct measure of the load resistance and can be easily compared to a reference pressure, the differential of which will provide the load disturbance term to the control law in lieu of the PID controller or even as an additional term to be summed in the control law, Further, the ram pressure readings can be compared to the pressure readings in the mold for further verification and control.

The invention has been described with reference to a preferred embodiment. Modifications and alterations will occur to those skilled in the art upon reading and understanding the Detailed Description of the invention set forth herein. For example, the invention has been described as utilizing a finite impulse response filter which is sometimes otherwise known as an FIR filter, a transversal filter, a tapped delay line filter, or a moving average filter and, at least one control author, has identified all such filters as a nonrecursive filter. In contrast to the disclosed filter, those skilled in the art will recognize that other types of filters such as an infinite impulse response filter or other recursive type filters can be employed. It is intended to include all such modifications and alterations insofar as they come within the scope of the present invention.

Having thus defined the invention, it is claimed:

1. A method for controlling the speed of a ram in an injection molding machine during the injection step of the molding cycle after the operator has set a plurality of velocity set points, said method comprising the steps of:

a. machine generating a second, larger plurality of set point signals from said operator set points, each set point signal indicative of a set ram velocity at a set ram travel position in a sequence defining a velocity profile said ram is to emulate during said injection step;

b. automatically adjusting selected set point signals for processing by a machine generated calibrated factor so that any selected set point signal of a given speed will cause said ram to move at approximately the same speed when the machine is not under load;

c. modifying the selected set point signals to account for the load imposed on the machine by the molding material being injected to produce velocity control signals at set ram positions corresponding to said velocity profile; and d. applying said control signals as a drive signal to the machine for controlling the speed of the ram.

2. The method of claim 1 wherein said machine is hydraulically driven and said calibrated factor is determined by performing the following steps:

i) initializing the machine so that a) the ram's translational axis is set b) the machine's ram position sensor is set to record ram speed and c) voltage signals inputted to the hydraulic proportioning valve controlling ram speed are set to correspond to digitized signals;

ii) increasing voltage output to said valve until ram movement sensed by said machine occurs and machine recording said output as a digitized valve offset signal;

iii) incrementally increasing voltage output beyond said offset and recording ram speeds detected for each incremental increase;

iv) and thereafter machine recording the voltage output level whereat maximum ram rated speed is detected as a digitized valve span signal.

3. The method of claim 1 wherein said modifying step further includes the steps of generating ram position signals indicative of the actual position of said ram in real time during said injection stroke and selecting set point signals in said velocity profile at advanced ram travel positions which have not been traversed at the time the set point signal is selected for application as said control signal, said set point signal selected from said velocity profile at said advanced position being an open loop predictive control signal.

4. The method of claim 1 wherein said modifying step further includes the steps of generating ram position signals indicative of the actual position of said ram in real time during said injection stroke and generating real time ram velocity signals from said ram position signals, selecting set point signals in said velocity profile at the ram position at which said ram positions signals were detected and comparing said real time ram velocity signals with said selected set point signals at the sensed ram position to produce an error signal and modifying the set point signals selected for processing in step (b) as said control signal with said error signal in step (c) to produce said drive signal in step (d) as a closed loop drive signal.

5. The method of claim 3 wherein said modifying step further includes the steps of generating real time ram velocity signals corresponding to the real time ram positions; comparing said real time ram velocity signals with set point signals in said velocity profile at the detected ram positions to generate an error signal; storing said error signals at the detected real time ram positions and modifying said predictive control signals by the error signal stored at the advanced travel positions of said predictive control signal to produce said driving signal as an open loop, load compensated signal.

6. The method of claim 5 wherein said modifying step further includes the steps of modifying selected set point signals in said velocity profile at the detected real time ram positions whereat said real time velocity signal is generated by said error signal and summing the error compensated control signal at the real time ram position with said predictive control signal modified by said stored error signal to produce said driving signal as a combined closed loop and open loop, load compensated signal.

7. The method of claim 1 wherein said set point signals in said velocity profile number about 100 equally spaced signals per inch of ram travel.

8. The method of claim 4 wherein said step of comparing is accomplished through a PID controller.

9. The method of claim 3 wherein said advanced ram travel position is determined by a finite impulse response filter.

10. The method of claim 4 wherein said real time ram velocity signal is determined by a finite impulse response filter.

11. The method of claim 8 wherein said calibrating step further includes the additional steps of v) recording the time it takes for said ram to reach at least one set percentage of maximum ram speed and using said time to reach said set percentage to machine tune said PID controller.

12. The method of claim of claim 5 wherein only a set percentage of said error is stored, each current molding cycle adjusting said predictive control signal by the stored error signal at the advanced position of the immediately preceding molding cycle while overwriting said stored errors of the preceding cycle with set percentages of current cycle, real time error signals.

13. The method of claim 10 wherein said overwriting step proceeds only for a limited number of molding cycles.

14. The method of claim 13 wherein said overwriting step factors the error signals generated during the current cycle with stored errors.

15. A system for variably controlling the speed of the ram of an injection molding machine during the injection stroke of a molding cycle comprising:

means for selecting a plurality of user set points specifying set ram velocities at set ram travel positions which said ram is to achieve during said injection stroke, means for automatically establishing a second larger plurality of machine set point signals from said user set points indicative of set ram velocities at set tram travel positions and defining a locus of set travel and velocity points in turn defining a velocity profile which said ram is to emulate during said injection stroke;

means for determining a load compensated velocity control signal for each machine set point signal at a set time during the injection stroke, said determining means including means for sensing the real time position of said ram during said injection stroke and means for applying an automatically established calibrated factor to each set point signal causing said ram to move at approximately the speed of a set point signal when the machine is not under load;

means to apply said velocity control signals as a variable drive signal to said machine to cause said ram to variably move during said injection stroke at speeds corresponding to said velocity profile.

16. The system of claim 15 wherein said means to determine said velocity control signals further includes predictive means for selecting set point signals at advanced ram travel positions which have not been traversed at the time the set point signal is selected for processing as said velocity control signal whereby the velocity control signal accounts for the response latency of said machine, said selected set point signal occurring in the future being a predictive set point signal.

17. The system of claim 15 wherein said means to determine said velocity signals further includes means for developing real time ram velocity signals from said real time ram position signals and controller means for developing error signals modifying real time set point signals processed as velocity control signals, said controller means including feedback means for comparing said real time ram velocity signals with specific set point signals in said velocity profile at said real time ram travel position to produce a difference signal corresponding to an error signal whereby any set point signal selected for processing into a velocity control signal is modified by said error signal to account for differences between a real time specified ram speed and a real time detected ram speed.

18. The system of claim 16 wherein said means to determine said velocity control signals further includes disturbance means for modifying a predictive control signal by an error signal, said disturbance means including feedback means to compare a real time ram velocity signal with a real time set point signal in said velocity profile at said real time ram travel position to produce a difference signal corresponding to an error signal and disturbance storage means for storing each error signal produced at set ram travel positions during any given injection stroke, said disturbance means selecting an error signal stored at said ram travel position for any given predictive control signal and modifying said predictive control signal by said selected error signal whereby said velocity drive signal accounts for disturbances attributed to the melt resisting the motion of the ram.

19. The system of claim 18 wherein said means to determine said velocity signals further includes means for developing real time ram velocity signals from said real time ram position signals and controller means for developing error signals modifying real time set point signals processed as velocity control signals, said controller means including feedback means for comparing said real time ram velocity signals with specific set point signals in said velocity profile at said real time ram travel position to produce a difference signal corresponding to an error signal whereby any set point signal selected for processing into a velocity control signal is modified by said error signal to account for differences between a real time specified ram speed and a real time detected ram speed.

20. The system of claim 15 wherein said machine includes valve means controlling ram speed, and said means for applying said calibrated factor includes means for machine determination of control signals corresponding to offset and span settings of said valve means.

21. The system of claim 15 wherein said plurality of velocity set point signals number about one hundred separate signals per inch of ram travel.

22. The system of claim 17 wherein said controller means includes a PID controller and said means for applying said calibrated factor includes machine set control loops for said PID controller.

23. The system of claim 18 wherein said predictive means includes a finite impulse response filter for determining said predictive position in the future whereat said predictive signal is generated.

24. The system of claim 17 wherein said means to generate real time velocity signals includes a finite impulse response filter.

25. The system of claim 15 wherein said drive signal controls the opening and closing of a hydraulic valve controlling the output of a hydraulic pump.

26. The system of claim 15 wherein said drive signal comprises the velocity command signal of a vector controlled AC induction motor controlling the speed and position of said ram.

27. A system for variably controlling the speed of the ram of an injection molding machine during the injection stroke of a molding cycle comprising:

means for selecting a plurality of user set points specifying desired ram velocities at specified ram travel positions, means for automatically establishing, from said user at points a second larger plurality of set point signals indicative of a user set velocity profile having a plurality of set ram speeds at set ram travel positions which said ram is to emulate during said injection stroke;

means to modify said set point signals selected from said velocity profile at specified ram positions to produce velocity control signals; said means to modify including predictive means for selecting set point signals at advanced ram travel positions which have not been traversed at the time the set point signal is selected for precessing as said velocity control signal, said selected set point signals being predictive control signals; and means to apply said velocity control signals as a drive signal to said machine to cause said ram to variably move during said injection stroke at speeds corresponding to said velocity profile.

28. The system of claim 27 wherein said means to modify further includes means to generate ram position signals indicative of the actual ram position at real time during said injection stroke and means to generate ram real time velocity signals from said ram position signals.

29. The system of claim 28 wherein said means to modify further includes controller means for developing error signals modifying said set point signals, said controller means including feedback means for comparing said real time ram velocity signals with specific set point signals in said velocity profile at said real time ram travel position to produce a difference signal corresponding to an error signal whereby any set point signal selected for processing into a control signal is modified by said error signal to account for differences between a real time specified ram speed and a real time detected ram speed.

30. The system of claim 29 wherein said means to modify includes disturbance means for modifying a predictive control signal by said error signal, said disturbance means including said feedback means and disturbance storage means for storing each error signal produced at set ram travel positions during an injection stroke, said disturbance means selecting an error signal stored at said ram travel position for any given predictive control signal and modifying said predictive control signal by said selected error signal whereby said velocity drive signal accounts for disturbances attributed to the melt resisting the motion of the ram.

31. The system of claim 30 further including means for automatically adjusting said set point signals by a calibrated factor so that any set set point signal of a given speed will cause said ram to move at approximately the same speed when the machine is not under load.

32. The system of claim 31 wherein said machine includes valve means controlling ram speed, and said means for applying said calibrated factor includes means for machine determination of control signals corresponding to offset and span settings of said valve means.

33. The system of claim 31 wherein said controller means includes a PID controller and said means for applying said calibrated factor includes machine set control loops for said PID controller.

34. The system of claim 33 wherein said predictive means includes a finite impulse response filter for determining said predictive position in the future whereat said predictive signal is generated.

35. The system of claim 34 wherein said plurality of velocity set point signals number about one hundred separate signals per inch of ram travel.

* * * * *